United States Patent
Luthe et al.

(10) Patent No.: US 11,938,421 B2
(45) Date of Patent: Mar. 26, 2024

(54) METHOD AND DEVICE FOR SEPARATING AND/OR CLEANING AEROSOLS AND SOLID MATERIAL PARTICLES AND FIBERS FROM GASES AS WELL AS SOLID MATERIAL PARTICLES AND FIBERS FROM LIQUID MATERIALS BY ACOUSTOPHORESIS

(71) Applicant: WINDPLUSSONNE GMBH, Gronau (DE)

(72) Inventors: Gregor Luthe, Gronau (DE); Ludger Gausling, Heek Nienborg (DE); Niels Ten Thije, TG Enschede (NL)

(73) Assignee: WINDPLUSSONNE GMBH, Gronau (DE)

(*) Notice: Subject to any disclaimer, the term of this patent is extended or adjusted under 35 U.S.C. 154(b) by 703 days.

(21) Appl. No.: 16/082,521

(22) PCT Filed: Mar. 5, 2017

(86) PCT No.: PCT/EP2017/000285
§ 371 (c)(1),
(2) Date: Sep. 5, 2018

(87) PCT Pub. No.: WO2017/153038
PCT Pub. Date: Sep. 14, 2017

(65) Prior Publication Data
US 2019/0070528 A1 Mar. 7, 2019

(30) Foreign Application Priority Data

Mar. 6, 2016 (DE) ...................... 10 2016 002 599.9
Mar. 6, 2016 (DE) ...................... 10 2016 002 600.6

(51) Int. Cl.
*B01D 21/28* (2006.01)
*B01D 21/34* (2006.01)
(Continued)

(52) U.S. Cl.
CPC ............ *B01D 21/283* (2013.01); *B01D 21/34* (2013.01); *B01D 43/00* (2013.01); *B01D 49/006* (2013.01)

(58) Field of Classification Search
CPC ....... B01D 49/006; B01D 43/00; B01D 51/08
See application file for complete search history.

(56) References Cited

U.S. PATENT DOCUMENTS

| 4,108,759 A | 8/1978 | Young |
| 4,307,964 A | 12/1981 | Dudgeon et al. |

(Continued)

FOREIGN PATENT DOCUMENTS

| CA | 2097070 A1 | 5/1992 |
| CN | 1334755 | 2/2002 |

(Continued)

OTHER PUBLICATIONS

Written Opinion for International Application No. PCT/EP2005/000285 filed on Mar. 5, 2017 on behalf of WINDPLUSSONNE GMBH. dated Sep. 25, 2017. 19 pages (English + German Original).

(Continued)

*Primary Examiner* — Elizabeth Insler
(74) *Attorney, Agent, or Firm* — Weiss & Arons LLP

(57) ABSTRACT

The invention relates to an aggregating device for separating and/or cleaning aerosols and solid material particles and fibers from gas as well as solid material particles and fibers from liquid materials by acoustophoresis, comprising I) conveying means for receiving and/or conveying an aerosol and/or a liquid material in the conveying direction into the aggregating device, II) at least one exciter for generating an acoustic sound wave which impinges upon the aerosol and/or the liquid material, and III) a mechanism for separating a first material part containing condensed liquids (Continued)

and/or aggregated solid materials from the aerosol and/or the liquid material, and the use thereof for carrying out the acoustophoric method.

19 Claims, 11 Drawing Sheets

(51) Int. Cl.
  *B01D 43/00* (2006.01)
  *B01D 49/00* (2006.01)

(56) References Cited

U.S. PATENT DOCUMENTS

| | | | |
|---|---|---|---|
| 4,759,775 | A | 7/1988 | Peterson et al. |
| 4,893,886 | A * | 1/1990 | Ashkin ............... G01N 15/10 359/350 |
| 5,225,089 | A | 7/1993 | Benes et al. |
| 5,527,460 | A | 6/1996 | Trampler et al. |
| 5,769,913 | A | 6/1998 | Gallego et al. |
| 5,827,350 | A * | 10/1998 | Magill ............... B01D 49/006 95/29 |
| 5,902,489 | A * | 5/1999 | Yasuda ............... B01J 19/10 73/863.21 |
| 5,902,849 | A | 5/1999 | Heucher et al. |
| 6,224,652 | B1 | 5/2001 | Caperan et al. |
| 6,322,614 | B1 | 11/2001 | Tillmans |
| 6,447,574 | B1 | 9/2002 | Frier, Jr. et al. |
| 7,674,620 | B2 | 3/2010 | Totey et al. |
| 7,674,630 | B2 | 3/2010 | Siversson |
| 8,454,716 | B2 * | 6/2013 | Sedillo ............... F02C 7/00 55/345 |
| 2002/0194988 | A1 | 12/2002 | Betting et al. |
| 2003/0200864 | A1 | 10/2003 | Meegan, Jr. |
| 2004/0226437 | A1 | 11/2004 | Stenersen et al. |
| 2006/0037916 | A1 | 2/2006 | Trampler |
| 2008/0181828 | A1 | 7/2008 | Kluck |
| 2009/0283480 | A1 | 11/2009 | Schadler et al. |
| 2011/0171090 | A1 * | 7/2011 | Johnson ............... B01D 53/007 423/210 |
| 2012/0267288 | A1 | 10/2012 | Chen et al. |
| 2012/0325727 | A1 | 12/2012 | Dionne et al. |
| 2015/0265961 | A1 | 9/2015 | Davey et al. |
| 2016/0059206 | A1 | 3/2016 | Chen et al. |
| 2016/0339360 | A1 | 11/2016 | Lipkens et al. |
| 2018/0346348 | A1 | 12/2018 | Collins et al. |
| 2019/0060811 | A1 | 2/2019 | Reuben |
| 2019/0070528 | A1 | 3/2019 | Luthe |
| 2020/0009286 | A1 | 1/2020 | Zarcone et al. |
| 2021/0341370 | A1 | 11/2021 | Luthe et al. |

FOREIGN PATENT DOCUMENTS

| | | |
|---|---|---|
| CN | 1334897 | 2/2002 |
| CN | 1982781 | 6/2007 |
| CN | 102183033 | 9/2011 |
| CN | 104363996 | 2/2015 |
| CN | 204619662 | 9/2015 |
| CN | 205669422 | 11/2016 |
| CN | 108093625 | 5/2018 |
| CN | 108368737 | 8/2018 |
| DE | 19513603 A1 | 10/1996 |
| DE | 19846115 | 4/2000 |
| DE | 69705226 T2 | 9/2001 |
| DE | 69628389 T2 | 4/2004 |
| DE | 102009036948 A1 | 2/2011 |
| EP | 0773055 A2 | 5/1997 |
| EP | 0773055 A3 | 6/1997 |
| EP | 0923410 B1 | 6/2001 |
| EP | 0773055 B1 | 5/2003 |
| EP | 3916315 | 12/2021 |
| GB | 460795 A | 2/1937 |
| JP | S 59154151 | 9/1984 |
| JP | 07047259 | 2/1995 |
| JP | H09122480 | 5/1997 |
| JP | H09122480 A | 5/1997 |
| JP | 2004042044 | 2/2004 |
| JP | 2018-134612 | 8/2018 |
| KR | 101442486 | 9/2014 |
| RU | 2740899 | 1/2021 |
| WO | 92/09354 A1 | 6/1992 |
| WO | WO92/09354 | 6/1992 |
| WO | WO00/00294 | 1/2000 |
| WO | WO2011/152796 | 12/2011 |
| WO | WO2017/153038 | 9/2017 |
| WO | WO2017/154804 | 9/2017 |
| WO | WO2020/078577 | 4/2020 |
| WO | WO2020/164792 | 8/2020 |

OTHER PUBLICATIONS

Preliminary Brazilian Office Action forBR Application No. BR112018067809-0 filed on Mar. 3, 2017 on behalf of WINDPLUS-SONNE GMBH. Prepared on: May 6, 2021. 5 Pages. Portuguese Original + Partial Informal Translation.
German Search Report for German Patent Application No. 102016002599.9 filed Mar. 6, 2016 on behalf of WINDPLUS-SONNE GMBH. dated Nov. 15, 2016. 7 pages (English Translation of selected portions + German Original).
German Search Report for German Patent Application No. 102016002600.6 filed Mar. 6, 2016 on behalf of WINDPLUS-SONNE GMBH. dated Dec. 2,2016. 11 pages (English Translation of selected portions + German Original).
Kapishnikov, et al. "Continuous particle size separation and size sorting using ultrasound in microchannel." *Journal of Statistical Mechanics: Theory and Experiment*, IOP Publishing, S. 1-15,doi: 10.1088/1742-5468/2006/01/P01012, (Jan. 2006).
Internatianal Search Report for international Application No. PCT/EP2017/000285 filed Mar. 5, 2017 on behalf of WINDPLUS-SONNE GMBH. dated Sep. 25, 2017. 7 pages. (English Translation + German Original).
International Search Report for International Application No. PCT/EP2019/000293 filed on Oct. 14, 2019 on behalf of Smart Material Printing B.V. dated Jan. 22, 2020. 6 pages (English translation and German language original).
K. W. Lee, et al., "On the Minimum Efficiency and the Most Penetrating Particle Size for Fibrous Filters," Journal of the Air Pollution Control Association, vol. 30, No. 4, pp. 377-381, Apr. 1980.
Günter Oberdörster, et al., "Nanotoxicology, An Emerging Discipline Evolving from the Studies of Ultrafine Particles," Environmental Health Perspectives, vol. 113, No. 7, pp. 823-839, Jul. 2005.
Günter Oberdörster, et al., "Toxicology of nanoparticles: A historical perspective," Nanotoxicology, vol. 1, No. 1, pp. 2-25, Mar. 2007.
Australian Government—IP Australia, Examination Report No. 1 in Australia Patent Application No. 2017229176, dated Nov. 30, 2021.
State Intellectual Property Office of People's Republic of China, First Office Action in Chinese Patent Application No. 201980081404. 9, dated Mar. 25, 2022 (uncertified English language translation).
State Intellectual Property Office of People's Republic of China, First Office Action in Chinese Patent Application No. 201780027747. 8, dated Aug. 19, 2020 (uncertified English language translation).
State Intellectual Property Office of People's Republic of China, Second Office Action in Chinese Patent Application No. 201780027747. 8, dated May 10, 2021 (uncertified English language translation).
State Intellectual Property Office of People's Republic of China, Third Office Action in Chinese Patent Application No. 201780027747. 8, dated Sep. 29, 2021 (uncertified English language translation).
State Intellectual Property Office of People's Republic of China, Fourth Office Action in Chinese Patent Application No. 201780027747. 8, dated Feb. 21, 2022 (uncertified English language translation).
Korean Intellectual Property Office, Office Action in Korean Application No. 10-2018-7028414, dated Oct. 28, 2021 (uncertified English language translation).
Japan Patent Office, Office Action in Japanese Patent Application No. 2018-547927, dated Feb. 17, 2021 (uncertified English language translation).

(56) References Cited

OTHER PUBLICATIONS

Japan Patent Office, Office Action in Japanese Patent Application No. 2018-547927, dated Jul. 13, 2021 (uncertified English language translation).

Madimir N. Khmelev et al., "The Limits of Fine Particle Ultrasonic Coagulation," Symmetry 2021, 13, 1607, https://doi.org/10.3390/sym13091607, MDPI (https://www.mdpi.com/journal/symmetry), Sep. 1, 2021.

Hou et al., "Possibilities of Using Ultrasonic Resonators in the Purification of Nuclear Aerosol Particles," Proceedings of the 24th International Conference on Nuclear Engineering, ICONE24. American Society of Mechanical Engineers, 2016.

Eurasian Patent Office, Office Action in Eurasian Patent Application No. 202191015, dated Jan. 28, 2022 (uncertified English language translation).

Eurasian Patent Office, Office Action in Eurasian Patent Application No. 20189196031, dated Jan. 29, 2020 (uncertified English language translation).

Eurasian Patent Office, Office Action in Eurasian Patent Application No. 20189196031, dated May 29, 2020 (uncertified English language translation).

Eurasian Patent Office, Office Action in Eurasian Patent Application No. 20189196031, dated May 12, 2021 (uncertified English language translation).

Eurasian Patent Office, Office Action in Eurasian Patent Application No. 20189196031, dated Dec. 23, 2021 (uncertified English language translation).

United States Patent and Trademark Office, Office Action in U.S. Appl. No. 17/678,291, filed May 5, 2022.

International Preliminary Report on Patentability in Application No. PCT/EP2017/000285, dated Sep. 11, 2018 (English translation and German language original).

International Preliminary Report on Patentability in Application No. PCT/EP2019/000293, dated Apr. 14, 2021 (English translation).

State Intellectual Property Office of People's Republic of China, Office Action in Chinese Patent Application No. 201780027747.8, dated Jul. 18, 2022 (uncertified English language translation attached).

European Patent Office, Examination Report in European Patent Application No. 19797980.0, dated Jul. 18, 2022 (uncertified and machine generated English language translation attached).

International Search Report and Written Opinion in International Application No. PCT/CA2023/051011, dated Oct. 10, 2023.

Larzelere, "New and Novel Technologies in Particulate Filtration," Naval Surface Warfare Center, Dahlgren Division, Published 2006.

"HEPA," Wikipedia, Published Sep. 19, 2015, https://en.wikipedia.org/w/index.php?title=HEPA &oldid=681842084, Year: 2015.

\* cited by examiner

METHOD AND DEVICE FOR SEPARATING AND/OR CLEANING AEROSOLS AND SOLID MATERIAL PARTICLES AND FIBERS FROM GASES AS WELL AS SOLID MATERIAL PARTICLES AND FIBERS FROM LIQUID MATERIALS BY ACOUSTOPHORESIS

CROSS REFERENCE TO RELATED APPLICATIONS

The present application is the U.S. national stage of International Patent Application No. PCT/EP2017/000285 filed on Mar. 5, 2017 which, in turn, claims priority to German application No. 102016002599.9 filed on Mar. 6, 2016, and German application No. 102016002600.6 filed on Mar. 6, 2016.

FIELD OF THE INVENTION

The present invention relates to a method for aggregating solid material particles and fibers of a liquid material, the use of acoustophoresis for aggregating the solid material particles and fibers of the liquid material, and an aggregating device for aggregating the solid material particles and fibers of the liquid material and their separation and/or purification from the liquid materials by acoustophoresis.

In addition, the present invention relates to a method for separating and/or purifying aerosols, in particular by means of aggregation, agglomeration, compression, segregation, concentration change and/or separation of components of the aerosol. The present invention further relates to an apparatus for carrying out the method and the use of acustophoresis for separating and/or cleaning the aerosols.

BACKGROUND

The documents cited in the present application are incorporated herein by reference.

In agriculture, considerable costs are incurred due to the transport and disposal of manure. To reduce this, the liquid content of manure is currently usually evaporated. This reduces the weight of manure and thus reduces transport and disposal costs. The remaining solid content can then be burned. Alternatively, it can also be used as fertilizer.

However, the vaporization of the liquid fraction causes considerable costs due to the high temperatures required (>80° C.). In addition, ammonia, hydrogen sulfide and other gases are vaporized with it and escape into the environment. In order not to evaporate the ammonia into the environment, binders are added to the manure during evaporation. However, this is only satisfactorily possible at room temperature.

Alternatively, the ammonia is bound in the manure by strong acids such as sulfuric acid. The resulting ammonium salts must be disposed of in an expensive manner.

In part, the ammonia is also ozonized, resulting in highly toxic oximes. The amount of ammonia reacted is also very low during ozonization.

Alternatively, to separate the solids content from the liquid fraction, the slurry is centrifuged. The solid material particles in the manure, however, have the same or similar density to the liquid. As a result, the separation is incomplete. Therefore, evaporation of the remaining liquid fraction or high speed centrifugation is also essential in this process.

Overall, there is currently no cost-effective way to dispose of the manure. In particular, there is no method by which the solid content of manure can be made recoverable in a cost-effective manner.

Acoustic methods and apparatus for separating solid material particles and fibers from liquid materials using stationary ultrasonic waves are known as such.

Kapishnikov et al. in the paper "Continuous particle size separation and size sorting using ultrasound in microchannel" in Journal of Statistical Mechanics: Theory and Experiment, IOP Publishing, 2006, describes the continuous separation and particle sorting of particles and blood cells in a microchannel flow.

U.S. Pat. No. 4,759,775 discloses the segregation or separation of particles from a liquid by means of the beating of two ultrasonic waves. US Patent Pub. US 2008/0181828 A1 discloses an ultrasound-working quarter-wavelength wave separation chamber which, among other things, serves for the separation of living cells.

U.S. Pat. No. 7,674,620 B2 discloses a method and a device for separating particles in liquids with stationary ultrasonic waves. There, the stationary ultrasonic waves between two different frequencies are switched back and forth. This allows particles of different properties to be separated from each other.

From German patent DE 696 28 389 T2 (EP 0 773 055 B1), a device for handling particles in liquids with ultrasonic waves is known, in which the wavelength of the ultrasonic beam is greater than the diameter of a suction line, which is provided in a wall surface of the flow channel as being substantially perpendicular to the flow of the suspension in the flow channel.

U.S. Pat. No. 5,527,460 likewise discloses an apparatus and a method for separating particles, in particular living cells, from dispersions. The device is connected directly to a bioreactor.

However, these known devices and methods are not suitable for being carried out on a commercial or industrial scale.

In production, for example in the painting, paper and textile industries, aerosols are produced that can have different structures. Such aerosols can be formed from particles, fibers, particulates, emulsions or liquids in a gas. The aerosols must be separated by fractions, separated, aggregated, agglomerated, and/or compressed, and/or the concentrations of their constituents must be changed to separate their reusable constituents and/or waste constituents.

So far, this is usually done by means of filters or an air bubbling device, such as a vortexer, which can be filtered. However, filters have the disadvantage of becoming clogged to form dusts, fiber aggregates, and/or adhesions, which in turn lead to contamination. In addition, the performance of the filters is never the same, but depends instead on the status of the loading of the filter and its properties.

Filters must therefore be replaced regularly. Their effectiveness is not constant. The cleaning achieved with them is thus variable. In addition, the filters count as additional waste.

Also, water walls, air supply, fall winch, cardboard and other catchers are used to catch the aerosols. However, these lead to an additional generation of waste, blockages of the filter and/or an energetically unfavorable exhaust air purification. In addition, they are very expensive and labor intensive. Furthermore, their use hampers the continuous operation of the plants, such as a painting line.

The production of combustible gases, such as the combustion and pyrolysis of organic materials, results in particles, water, pitch, oils and/or waxes which must be filtered to prevent them from entering the environment. To clean the resulting gases, carbon filters and drying lines are used.

Overall, there is currently no cost-effective method for cleaning and separation of aerosols, which is environmentally friendly, possibly leading to a recycling of existing aerosol components and a consistent quality of cleaning.

Acoustic methods and devices for the separation and/or purification of aerosols and solid material particles and fibers from gases by means of stationary ultrasonic waves are known as such.

From US patent pub. US 2015/0265961 A1, a device for agglomeration and separation of aerosols by means of ultrasound is known, in which a device for cooling the ultrasound source is provided.

German patent DE 697 05 226 T2 (EP 0 923 410 B1) discloses in connection with international patent application WO 92/09354 a method and a device for the agglomeration of particles in a gas stream. The gas stream flows through an acoustic agglomeration chamber, selectively withdrawing a portion of the flow at the outlet of the chamber, preferring larger particles, and feeding it back to the inlet of the chamber. The device can be installed at the entrance of a known filter, which retains especially large particles.

From German patent publication DE 195 13 603 A1 also a method and an apparatus for the separation of solid material particles and/or droplets from a liquid using existing ultrasonic waves are known. The concentrated solid material particles and/or droplets are separated from the liquid by means of a known separator.

German patent publication DE 10 2009 036 948 A1 discloses a method and a system for reducing nitrogen oxides in dust-containing exhaust gases by means of an SCR catalyst, in which the apparatus is preceded by a device for separating dust by means of ultrasound.

However, these known devices and methods are not suitable for being carried out on a commercial or industrial scale.

OBJECT OF THE PRESENT INVENTION

Object of the present invention is to provide a method and apparatus with which liquid materials such as liquid waste, fermentation residues, animal waste, especially manure, slaughterhouse waste, slurry, excrement, kitchen waste, biowaste, organic and/or inorganic particulate and fiber materials in a liquid, biogas plant waste, surface coating agents, paint residues, sewage sludge and/or effluent, can be disposed of in a sustainable, cost-effective and environmentally friendly manner, wherein the solid content is recyclable. In addition, the method and the device filters, in particular HEPA filters, can be provided upstream, so that the filters do not or only to a very limited extent clog, and so that their life can be extended in a significant manner. The process can be carried out on a technical and industrial scale with correspondingly dimensioned devices.

In addition, it is object of the present invention to provide a method and a device therefor which avoids the disadvantages mentioned above, and allows the segregation, separation and/or cleaning of an aerosol into its components in an environmentally friendly, qualitatively consistently good and inexpensive manner. In addition, the method and the device filters, in particular HEPA filters, can be provided upstream, so that the filters such as upstream filter being shown at 93 do not or only to a very limited extent clog, or, alternatively, downstream filters at 94 or 95

Last but not least, the methods and the devices allow destruction of microorganisms, in particular bacterial cells, by means of high-energy ultrasound waves.

OBJECT ACHIEVEMENT

The object of the present invention has been achieved by an aggregating device in accordance with the present disclosure. Preferred embodiments are also disclosed.

DETAILED DESCRIPTION OF THE INVENTION

According to the inventive method for the separation and/or purification of aerosols and solid material particles and fibers from gases as well as solid material particles and fibers from liquid materials by condensation, aggregation, agglomeration, compression, segregation, separation and/or concentration changes of components of the aerosol and/or the solid material particles and/or solid material fibers in at least one aggregating device A) at least one type of aerosol and/or at least one type of liquid material selected from the group consisting of a conveyor belt, a liquid pressure, a liquid column and a liquid wave of the liquid material, sound waves modulated in the conveying direction, a centrifugal force, a centripetal force, a Coriolis force, gravitation, an injector, a venturi, a diffuser, a liquid multiplier, a gas multiplier, a Dyson, a ducted turbine, a delta wing concentrator, an annular venturi, a magnus effect turbine, a berwian or berlin wind turbine, a passive and active convection, effusion and diffusion, is or are conveyed by at least one conveying means in at least one conveying direction in at least one aggregating device, B) wherein the at least one type of aerosol and/or the at least one type of liquid material is or are in the meantime acted upon by at least one acoustic sound wave such that the aerosols and solid material particles and fibers move from the gases and/or the solid material particles and fibers move from the liquid materials by means of the force of the at least one sound wave towards at least one pressure node or at least one pressure antinode and wherein C) at least one first, condensed liquid- and/or aggregated solid-containing material part is then separated from the at least one aerosol and/or the at least one liquid material.

A liquid material according to the invention is an organic and/or inorganic liquid material, in particular a dispersion or a suspension.

Such liquid materials are, for example, liquid waste, biogas plant waste, surface coating agents, paint residues, sludges from the textile or paper industry, fermentation residues, animal waste, manure, slaughterhouse waste, slurry, excrement, fecal wastewater, silage, grain post waste, garbage or effluent. The liquid material may contain solid material particles and fibers of different size and/or density. The size of the solid material particles and fibers may be nanometers, microns, millimeters, centimeters, and/or decimeters. The liquid material may have a slightly liquid, low to pasty, or high viscosity.

When applying the liquid material with the sound wave, the latter penetrates the liquid material. The liquid material is put into natural vibration. The application of the liquid material with the at least one acoustic sound wave causes the solid material particles and fibers to be moved towards the pressure node or the pressure antinode. As a result, the solid material particles and fibers accumulate in a space around the pressure node or around the pressure antinode. In this case, the solid material particles and fibers move depending on, for example, their size, their tightness, their moment of inertia and/or their compressibility to the pressure node or antinode.

Preferably, the liquid material is acted upon by a plurality of acoustic sound waves, which are spatially spaced from each other. As a result, the spatial area extends approximately concentrically around a line connecting the pressure nodes or the pressure antinodes. In a preferred embodiment, the liquid material is acted upon by the acoustic sound waves while it is conveyed in the conveying direction. In this embodiment, the solid material particles and fibers are accumulated in the space area while being conveyed in the conveying direction.

The sound waves are preferably formed as stationary waves. Particularly preferably, stationary ultrasonic waves are used.

The sound waves preferably propagate at an angle >0° with respect to the conveying direction. In a preferred embodiment, the angle is a right angle. As a consequence, corresponding exciters provided for generating the stationary waves can be arranged opposite to each other. The line connecting pressure nodes or antinodes then extends in the conveying direction.

In principle, however, the propagation direction can also be arranged at a different angle with respect to the conveying direction, wherein the exciters are then also arranged at an angle to each other.

In order to separate certain solid material particles and fibers from other solid material particles and fibers, the method may also provide to apply to the liquid material sound waves having different frequency, shape and/or amplitude. Also in this embodiment, the sound waves are preferably spatially spaced from each other. In principle, the shape of the sound waves may be arbitrary, for example sinusoidal, sawtooth, rectangular or triangular.

According to the invention, it is preferable to dynamically control the sound waves digitally via the phase of different waves, so that the pressure nodes and the pressure antinodes in the at least one aggregating device can be moved in a controlled manner to preselected locations. Preferably, the control of individual pressure notes and pressure antinodes is performed using a combination of Boolean logic gates.

In order to separate certain solid material particles and fibers from other solid material particles and fibers, it is also preferable to use harmonics of the sound waves having a plurality of pressure nodes and antinodes. As a result, various solid material particles and fibers are aggregated in the various pressure nodes and pressure antinodes. The various solid material particles and fibers are separated from each other.

Such partial flows of different solid material particles and fibers are further preferably focused by being subjected to a harmonic of the sound wave having less pressure nodes and pressure antinodes, or a sound wave of different frequency, shape and/or amplitude, which has fewer pressure nodes and antinodes. As a result, the partial flows are brought together.

It is further preferred to use sound waves whose frequency and/or volume is outside the hearing range of humans and animals. Additionally or alternatively, it is preferred for this purpose to use sound-insulating means, in particular noise-lowering or noise-reducing loudspeakers (active noise canceling, passive noise canceling or suppression).

In the antinode of the sound wave, the pressure acting on the solid material particles and fibers is great. As a result, the solid material particles and fibers are pushed away. On one hand, the solid material particles and fibers are thereby concentrated in the spatial area and therefore the liquid material in the spatial area is dried and solidified. In addition, a liquid film is formed around the space area, due to which the liquid material is transportable even with pasty consistency by containers with relatively small pipe diameter.

In order to improve the conveyance of the liquid material even further, the liquid material can also be introduced into a conveying fluid (sheet layer) before the impact with the sound wave, which preferably completely surrounds the liquid material. The delivery fluid forms a laminar or turbulent boundary layer. As a result, adherence of the liquid material to a container inner wall can be avoided and/or a conveying speed of the liquid material in the container can be increased. The delivery fluid also forms a phase separation line that increases the ability of the liquid material to phase separate. As a result, at the same time a pre-separation of the liquid material is achieved, a separation of the solid material particles and fibers from the liquid material is improved and/or a separation chamber is formed.

In order to make the solid material particles and fibers usable as valuable material, for example a fertilizer, the first part of the material containing aggregated solid material particles and fibers, which has been concentrated in the area, is subsequently separated from the liquid material. Preferably, the first material part is spatially separated from the liquid material. Such separation is possible without evaporation of ammonia, hydrogen sulfide or other gases.

The process is preferably repeated until the first material part contains less than a defined limit liquid.

The application of the liquid material to the sound waves therefore not only makes it possible to aggregate the solid material particles and fibers but also, with such sound waves, a targeted separation of certain solid material particles and fibers from the liquid material or other solid material particles and fibers contained in the liquid material is possible. In addition, the application of the liquid material with the sound waves allows the conveying of the liquid material in the conveying direction. The process not only makes it possible to utilize the solids content of material flows. It also allows drying and/or solidification of paper, textiles or other fibers.

The object is further achieved with the use of acoustophoresis for aggregating solid material particles and fibers of a liquid material. By using acoustophoresis, the solid material particles and fibers present in the liquid material can be utilized. This is possible in an inexpensive manner without evaporation of the liquid material, without evaporation of the first material part and without the addition of binders.

The object is further achieved with an aggregating device for separation and/or purification of aerosols and solid material particles and fibers from gases as well as solid material particles and fibers from liquid materials by condensation, aggregation, agglomeration, compression, segregation, separation and/or concentration changes of components of the aerosol and/or the solid material particles and/or solid material fibers, comprising I) at least one conveying means selected from the group consisting of a conveyor belt, a liquid pressure, a liquid column and a liquid wave of the liquid material, sound waves modulated in the conveying direction, a centrifugal force, a centripetal force, a Coriolis force, gravitation, an injector, a venturi, a diffuser, a liquid multiplier, a gas multiplier, a Dyson, a ducted turbine, a delta wing concentrator, an annular venturi, a magnus effect turbine, a berwian or berlin wind turbine, passive and active convection, effusion and diffusion, in particular an injector, a venturi, a diffuser, a liquid multiplier, a gas multiplier, a Dyson, a ducted turbine, a delta wing concentrator, an annular venturi and a magnus effect turbine, for receiving and/or conveying at least one type of aerosol and/or at least one type of liquid material in at least one conveying direction in the aggregating device, II) at least one exciter for generating at least one acoustic wave, for applying the at least one type of aerosol and III) at least one means for separating at least first, condensed liquids and/or aggregated solids containing a material part of the at least one type of aerosol and/or the at least one type of liquid material.

By means of a force of the sound wave, the solid material particles and fibers contained in the liquid material are at least partially moved to a pressure node or to a pressure antinode of the sound wave. As a result, they concentrate in a space around the pressure node or antinode.

Preferably, in a direction of extension of the means for receiving and/or conveying the liquid material, a plurality of mutually spaced, in particular spatially offset, exciters for generating an acoustic sound wave are provided. As a result, the spatial area extends concentrically around a line connecting the pressure nodes or the pressure antinodes. It is preferred that the acoustic sound waves generated by the means propagate transversely to the direction of extension so that the line extends in the direction of extension.

The sound wave is preferably a stationary ultrasonic wave. For this purpose, the aggregating device furthermore preferably has respectively two mutually correspondingly formed exciters for generating a sound wave. The mutually corresponding means are preferably two piezoelectric elements, speakers or a piezoelectric element and/or a reflector.

Preferably, speakers are used as exciters for generating a sound wave, generating the sound wave through the piezoelectric elements. However, immersion coils, magnetostatic (ribbon, foil, jet tweeters) loudspeakers, electrostatic loudspeakers, horn drivers, flexural wave transducers, plasma loudspeakers, electromagnetic loudspeakers, exciters or ultrasonic transducers can also be used.

In order to concentrate several material parts of different composition in different spatial regions, use of sound waves having different frequency, amplitude and/or shape is preferred.

Further preferably, the spatial region or the spatial regions are selectively directed, for example by changing the amplitude of the sound wave and/or by changing the arrangement of the exciter to generate the sound wave.

The means for separating the aggregated solid material particles and the fiber-containing first material part of the liquid material preferably comprises at least one first outlet for the first material part, or at least one outlet for the liquid material. However, it can also have a second sequence for the respective other material part. In addition, it can have further processes if several material parts of different composition are concentrated in different spatial areas.

The means for receiving and/or conveying the liquid material preferably comprises a container, in particular a tube and/or a tank. The container may be made of a metal, a plastic or a composite. In principle, it can have any shape. In the container, the liquid is preferably conveyed in a conveying direction.

In a preferred embodiment, the container comprises at least two mutually parallel planar plates, on each of which at least two exciters or respectively an exciter and a reflector are arranged opposite each other. Preferably, the sheet-like plates are PCB plates.

The sound waves emitted by the at least two pairs of associated exciters are dynamically digitally controllable via the phase of different waves using a combination of Boolean logic gates so that the pressure nodes and the pressure antinodes in the at least one aggregator are controllably movable to preselected locations.

Alternatively or additionally, the means for receiving and/or conveying the liquid material for this preferably comprises a conveying means. The conveying means is preferably a liquid multiplier, a Dyson or a conveyor belt. In this embodiment, the extension direction is preferably the conveying direction. In addition to or instead of the conveying means for conveying the liquid material, a liquid pressure, a liquid column or a liquid wave of the liquid material, a centrifugal force, a centripetal force, a Coriolis force, gravitation, an injector, a venturi, a diffuser, a liquid multiplier, a Dyson, a ducted turbine, a delta wing concentrator, an annular venturi and a magnus effect turbine can be used.

In a further preferred embodiment, the sound waves generated by the exciters are used as conveying means for conveying the liquid material. To such purpose, the sound waves in the conveying direction are successively modulated, so that the liquid material, in particular the solid material particles and fibers, are conveyed in the conveying direction. Further preferably, an acoustic conveying sound wave is used whose propagation direction is the conveying direction.

In order to introduce the liquid material, an inlet is preferably provided at the front end of the aggregating device in the conveying direction. This is particularly preferably arranged in the container. The means for separating the first material part from the liquid material, however, is preferably arranged in the conveying direction behind the inlet, preferably at the rear end of the aggregating device.

In a particularly preferred embodiment, the means for receiving and/or for conveying the liquid material is designed as a conveyor belt. In this embodiment, moreover, a container, in particular a tank, may be provided. The conveyor belt can then simultaneously form the means for separating the first material part. Depending on how liquid the liquid material is, it is preferred that the conveyor belt is immersed in the liquid material. The liquid material is then taken up at a front, immersed end in the conveying direction of the conveyor belt. At a rear end in the conveying direction, the first material part is separated. In this embodiment, the exciters for generating the sound wave are arranged in an extension direction of the conveyor belt. To such purpose, they are preferably positioned on or in the conveyor belt or in the vicinity of the conveyor belt.

It is also preferred that the exciters for generating the sound wave are arranged in an extension direction of the aggregating device, particularly preferably in an extension direction of the container, the means for separating the first material part and/or the conveying means.

In the following, the aggregating device according to the invention and the methods according to the invention will be described in connection with aerosols.

Purification of the aerosol according to the invention covers aggregation, agglomeration, compression, separation, change of concentration and/or separation of the aerosol. An aerosol comprises a gas and a liquid distributed therein and/or a solid distributed therein. The liquid may be a pure liquid, a mixture of liquids, a dispersion and/or an emulsion. Liquids may furthermore be water, tars, pitches, organic solvents, inorganic solvents and/or mixtures thereof and emulsions. Solids can be particles, particles and fibers of organic and/or inorganic composition or bacteria, viruses and biofilms. The solids may further contain a residual liquid. Aerosols in the sense of the invention arise, for example, in the surface coating with paints, lacquers and sealants, in paper and/or textile production and in their further processing. Gases may be air, nitrogen and/or other gases.

In the following, solid and/or liquid components of the aerosol, in particular during and/or after the cleaning process (stages of separation, aggregation, concentration and agglomeration) will be referred to as the first material part. The second material part referred to below is the aerosol purified from the first material part. In the following, therefore, the terms second material part and aerosol are used synonymously.

The aerosol may contain liquids, in particular droplets, and/or solids, in particular particles and/or fibers, of different shape, size and or density. The size can be nanometer, micrometer, millimeter, centimeter and/or decimeter, the distribution can be homogeneous and inhomogeneous. The liquid and/or solid material of the aerosol may have different viscosities and/or densities.

The application of the aerosol with the at least one acoustic sound wave causes a kinetic force through which liquids and/or solids are moved towards the pressure nodes or the pressure antinodes. As a result, the liquid and/or solid components of the aerosol concentrate in a space around the pressure nodes or antinodes. In doing so, the liquids and/or solids move in dependence on, for example, their size, their density, their moment of inertia and/or their compressibility towards the pressure nodes or the pressure antinode.

Preferably, the aerosol is acted upon by a plurality of acoustic sound waves, which are spatially spaced from each other. As a result, the space area extends approximately concentrically around a line connecting the pressure nodes or the pressure antinodes. In a preferred embodiment, the aerosol is acted upon by the acoustic sound waves, while it is conveyed in the conveying direction. In this embodiment, the liquids and/or solids are concentrated in the space area while being conveyed in the conveying direction.

The sound waves preferably propagate at an angle greater than 0° to the conveying direction. Particularly preferably, the angle is a right angle. As a result, the line connecting pressure nodes or antinodes extends in the conveying direction.

The sound waves are preferably formed as stationary waves. Particularly preferably stationary ultrasonic waves are used.

In order to separate certain liquids and/or solids of the aerosol from other liquids and/or aerosol solids, the method may further provide for impinging the aerosol with sound waves of different frequency, shape and/or amplitude. Also in this embodiment, the sound waves are preferably spatially spaced from each other. In principle, the shape of the sound waves may be arbitrary, for example sinusoidal, rectangular or triangular.

In order to separate certain liquids and/or solids of the aerosol from other liquids and/or aerosol solids, it is also preferable to use harmonics of the sound waves having a plurality of pressure nodes and antinodes. As a result, various liquids and/or solids are aggregated, concentrated, compressed, agglomerated and/or combined in the various pressure nodes and pressure antinodes, depending on their density and/or inertia. Thus, the liquids and/or solids contained in the aerosol can also be separated from one another.

Such partial flows of different liquids and/or solids are further preferably focused by applying a sound wave of different frequency, shape and/or amplitude, which has fewer pressure nodes and antinodes. As a result, the partial flows are brought together.

It is further preferred to use sound waves whose frequency and/or volume is outside the hearing range of humans and animals. Additionally or alternatively, it is preferred for this purpose to use sound-insulating means, in particular active noise canceling.

In the pressure antinode of the sound waves, the pressure acting on the liquids and/or solids is great. In the pressure node, however, the pressure acting on the liquids and/or solids is small. As a result, the liquids and/or solids are driven to pressure nodes. On one hand, they are therefore unified, dried and solidified in the spatial area. On the other hand, a gas film forms around the space area, as a result of which the aerosol can be transported with a relatively small pipe diameter.

In order to further improve the delivery of the aerosol, the aerosol can also be introduced into a delivery fluid, in particular into a gas, a particle stream and/or a fibrous stream (sheet layer), before being exposed to the sound wave. Preferably, the delivery fluid completely surrounds the aerosol and/or the first material part. As a result, adhesion of the aerosol to a container inner wall can be avoided and a full speed of the aerosol in the container can be increased. The delivery fluid also forms a phase separation line at which the reactivity of the aerosol is increased. As a result, at the same time a pre-separation of the aerosol is achieved, a separation of the liquids and/or solids is improved and/or separation bacteria are produced.

The process is preferably repeated until the second material part contains less than a defined limit value of the first material part.

Therefore, applying the aerosol to the sound waves does not only allow the liquids and/or solids to be aggregated. But, with such sound waves a targeted separation of certain liquids and/or solids from the aerosol or other aerosol-containing liquids and/or solids is possible. In addition, the application of the aerosol with the sound waves makes it possible to convey the aerosol in the conveying direction.

The aerosol is preferably a surface coating material. By using acoustophoresis, the liquids and/or solids present in the aerosol can be recovered and recycled. This applies in particular to aerosols which contain paints, lacquers, sealants and/or fibrous material, such as textile, paper and/or their components and/or constituents, in particular additives, fillers, solvents, binders, hardeners and/or pigments.

The aerosol method according to the invention is carried out by means of the above-described aggregating device according to the invention.

By means of the force of the sound wave, liquids and/or solids containing the aerosol are at least partially moved toward a pressure node or to a pressure antinode of the sound wave. As a result, they concentrate in a space around the pressure node or antinode.

Preferably, a plurality of mutually spaced, in particular spatially offset exciters for generating an acoustic wave are provided in the conveying direction. As a result, the spatial area concentrically extends around a line connecting the pressure nodes or antinodes. It is preferred that the acoustic sound waves generated by the means propagate transversely to the conveying direction. In this embodiment, the line extends in the conveying direction.

The sound waves are preferably stationary ultrasonic waves. For this purpose, the aggregating device furthermore preferably has at least two exciters, each corresponding to one another, for generating a sound wave. The mutually corresponding means are preferably two piezoelectric elements or loudspeakers or a piezoelectric element and/or a reflector.

Preferably used as exciters for generating the sound waves are speakers, which generate the sound waves by means of piezoelectric elements. However, immersion coils, magnetostatic loudspeakers, horn drivers, flexural wave transducers, plasma loudspeakers, electromagnetic loudspeakers, exciters or ultrasound transducers can also be used.

In order to concentrate several liquids and/or solids of different composition in different regions of space, it is further preferred to use sound waves of different frequency, amplitude and/or shape.

Likewise preferred is that the spatial region or the spatial regions are specifically directed, for example by changing the amplitude of the sound waves and/or by changing the arrangement of the exciter to produce the sound waves.

In a preferred embodiment, the sound waves are dynamically controlled digitally via the phase of different waves using a combination of Boolean logic gates, so that the pressure nodes and antinodes in the aggregator can be controlled to preselected locations.

The means for receiving and/or conveying the aerosol may be the conveying means described above. Likewise, the containers described above come into consideration. The container may be constructed of a metal, a plastic and/or a composite. In principle, it can have any shape.

In addition to turbulent flow conditions of the aerosol in the container, a laminar aerosol stream is preferred, which forms laminar boundary layers and promotes separation and aggregation.

In a further preferred embodiment, the sound waves are used as conveying means for conveying the aerosol. For this purpose, the sound waves in the conveying direction are successively modulated, so that the aerosol, in particular the liquids and/or solids, are conveyed in the conveying direction. Further preferably, an acoustic conveying sound wave is used, whose propagation direction is the conveying direction.

For introducing the aerosol, an inlet is preferably provided at the front end of the aggregating device in the conveying direction. This is particularly preferably arranged in the container described above. By contrast, the means for separating the first material part from the aerosol is preferably arranged in the conveying direction behind the inlet, preferably at the rear end of the aggregating device.

It is also preferred that the exciters for generating the sound wave are arranged in an extension direction of the aggregating device, particularly preferably in an extension direction of the means for receiving and/or conveying the aerosol, in particular the container and/or the conveying means and/or the means for separating of the first material part of the second material part.

In a particularly preferred embodiment, the aggregating device is dynamically mobile, so that it can follow a spray head, for example in a painting line.

In a further preferred embodiment, the aggregating device comprises a plurality of containers for receiving and/or conveying the aerosol. The plurality of containers are preferably arranged one inside the other and/or nested inside each other. They are preferably formed from different tubes of the same or different diameters. Preferably, a plurality of tubes are surrounded by a tube. In this embodiment, the exciters are preferably arranged on the tubes. The embodiment has the advantage that there is a laminar flow in the tubes.

In a further preferred embodiment, the configuration containing the plates described above, in particular PCB plates, is used.

In yet another preferred embodiment, the aggregating device is embedded in a closed gas flow, for example circulating air in a room, for example in houses, in air conditioners, in medical ventilation, in closed vehicles, in particular in automobiles, trucks, buses, trains, ships and planes.

In yet another preferred embodiment, the aggregating device is integrated in space transitions, for example, from inside to outside. Here, the combination with a heat recovery is advantageous.

In a particularly preferred embodiment, the aggregating device has a radiator, in particular a UV (see UV radiator 15 in FIG. 1 (*a*)) IR or microwave radiator and/or a reflector arranged behind and opposite the radiator, wherein the radiator is intended to photochemically excite and/or to heat the first material part. This has the advantage that from a liquid of the aerosol larger, tougher and/or easier to collect particles are formed. As a result, a hardening of the aerosol can be accelerated. In addition, the agglomeration is chemically induced and accelerated by temperature. Furthermore, bacteria, biofilms and/or viruses are killed with the radiation of the radiator. The radiator is mounted in a wall, on the wall, inside or outside the container. In order to allow one by radiation of the aerosol, the container optionally has a window for the radiator. It is preferred to fasten the radiator vibration-free.

In a further particularly preferred embodiment, the aggregating device for collecting the first material part separated from the aerosol presents a surface, which is in particular formed as renewable, structured, smooth or rough, biocidal and/absorbent. The first part of the material is preferably conducted to the surface. The latter may be superhydrophobic, superhydrophilic, hydrophilic, hydrophobic and/or electrostatically charged or grounded. It can be mobile and/or be overflowed by a delivery fluid, preferably water. It is preferred that the surface binds and/or removes the first part of the material to prevent back migration into the aerosol or the generation of other contaminants.

Such a surface is preferably formed of a conveyor belt with a separator for separating the first material part or a moisture film, wherein the separated material part or the moisture film brought together with the first material part can be discharged in a material container or a drain.

In a further preferred embodiment, such a surface is formed of a particular renewable and/or wet film, fiber and/or textile film, which is constructed for example of a paper, a cardboard or a plastic film. In this form, the fiber and/or textile film and/or the film are disposable.

Depending on the application, it is further preferred that the aggregating device comprises a device for cooling or a device for heating.

In particular, the aggregating device according to the invention is suitable for equipping a painting device, in particular a painting line. By means of the aggregating device, the aerosols produced in the painting line can be separated and disposed of without elaborate filters.

In general, the aggregating device according to the invention is outstandingly suitable for being connected in front of filters, such upstream filters being shown at 94 or 95, in particular HEPA filters, as already described above.

The aggregating device according to the invention and the methods according to the invention are thus excellent for the disposal of liquid waste, digestate, animal waste, liquid manure, slaughterhouse waste, slurry, excrements, kitchen waste, biowaste, organic and/or inorganic particles and fiber materials in a liquid, biogas plant waste, surface coating agents, paint residues, sewage sludge and/or effluent and/or aerosols containing paints, varnishes, sealants and/or fiber material, for the destruction of microorganisms, in particular bacteria, for purifying air at home, in air conditioning, in medical ventilation in closed vehicles, especially automobiles, trucks, buses, trains, ships and aircraft, as well as in cell cultures. In addition, the recovered solids are recyclable.

The invention will be explained with reference to the figures with reference to embodiments, wherein further advantages of the invention will become apparent.

Figure 1A:
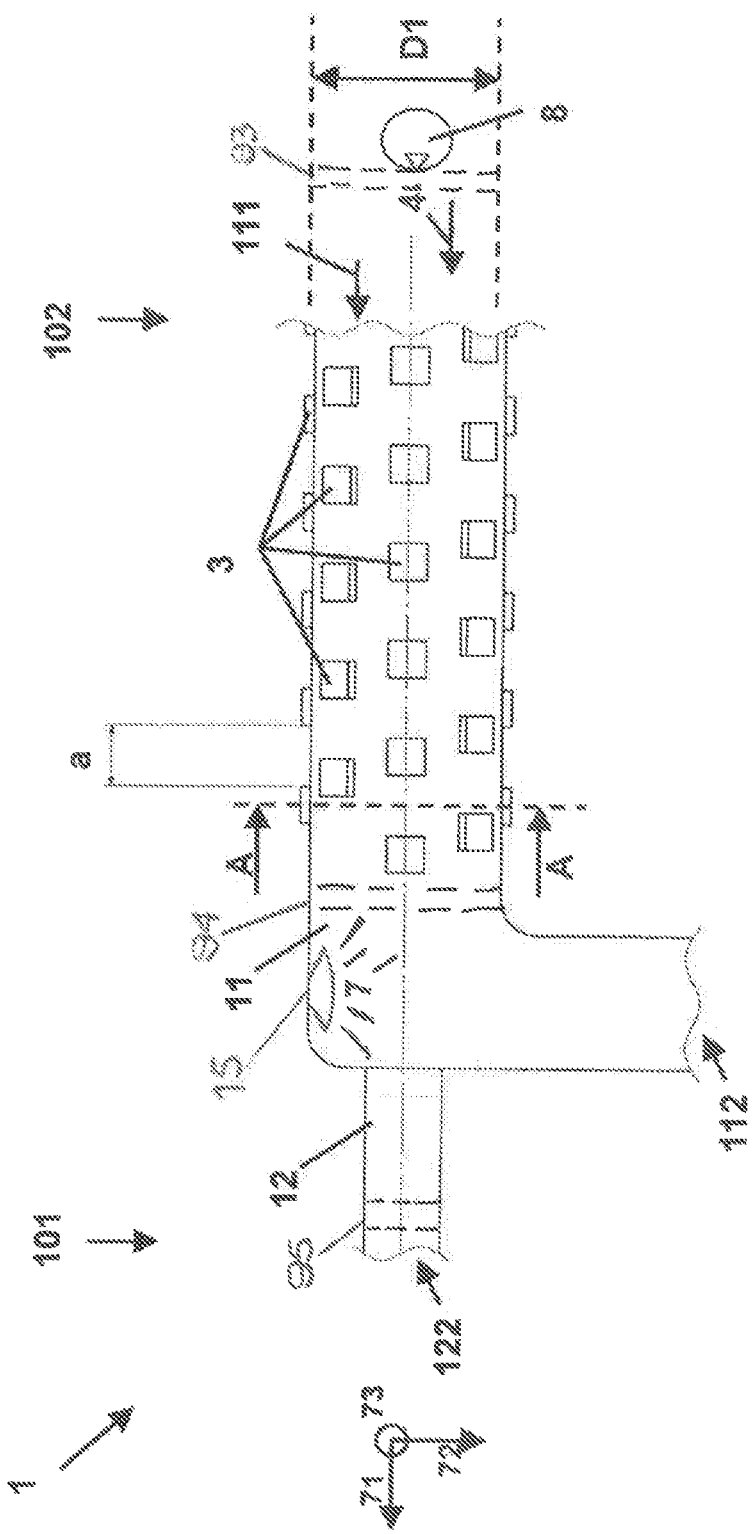
FIG. 1 shows in (a) a first embodiment of an aggregating device, in (b) a sectional view AA of the aggregating device in (a), in (c) a sectional view of a further embodiment of an aggregating device, and in (d) and (e), respective further sectional view of the aggregating device of (a)

In FIGS. 1 to 7, the reference numerals have the following meaning:

1 aggregating device
10 painting lines
101 front end
102 rear end
11 depictions of receipt of liquid material or aerosol, tube, tank
110 container interior
111 tank inlet
112 container discharge
113 surface
114 palm
115 wall
116 filler pipe
117 ground
118 retaining plate
119 recess
12 means for separating
121 branch inlet
122 branch outlet
13 receptacle
14 collection container for liquids and/or solids
15 spot and reflector (UV, IR, microwave)
16 workpiece
17 robots, spray arms, paint application
181 floor grilles
182 ceiling diffusers
19 conveyor belt, assembly line
2 liquid material, aerosol
21 first material part containing aggregated liquids and/or solids
211 liquids and/or solids
22 second material part
23 lubricating film
24 conveying fluid, sheet layer
3 exciters for generating a sound wave
31, 32 first and second exciter to create a stationary wave
4 conveying direction of liquid material 2 or of aerosol 2
5 acoustic sound wave, stationary wave
51 pressure nodes
52 pressure antinode
53 corner
54 propagation direction
7 axle, tank center
71, 72, 73 first, second and third spatial directions
74 circumferential direction
77 line
8 conveyor, Dyson, conveyor belt
81 conveyor belt surface
82 inclination
83 conveying side
84 upper circulation
85 lower circulation
9 return pan
91 fastener, screw, rivet
92 nut
a distance
d1 diameter of the delivery chamber
H height

DETAILED DESCRIPTION OF THE FIGURES

Aggregating Devices 1 and Methods with Liquid Materials 2

FIG. 1*a* shows a first embodiment of an aggregating device 1. The aggregating device 1 comprises a container 11 for receiving and for conveying a liquid material 2 (see FIG. 1(*d*), (*e*)). The container 11 extends in an extension direction 71. The container 11 has here a round cross section and extends concentrically to an axis. However, also containers 11 with a different cross section, for example, a rectangular or square cross section can be adopted. The container 11 is formed as a hollow cylinder and has an inner space 110 (see FIG. 1(*b*), (*c*)).

In order to introduce the liquid material 2, the container 11 has an inlet 111, which is provided in a conveying direction 4 at a front end 102 of the container. The liquid material 2 is conveyed by means of an additional conveying means 8 in the conveying direction 4 through the container 11. As conveying means 8, a Dyson is shown schematically here.

At a rear end 101 in the conveying direction 4, the aggregating device 1 has a means 12 for separating a first material part 21 (see FIG. 1(*d*), (*e*)) from the liquid material 2. The means for separating 12 is formed by a tubular container branch. The container branch 12 has a branch outlet 122 for the first material part 21.

For discharging the liquid material 2, the container 11 has a container outlet 112. The container outlet 112 is aligned here, only for clarity, transversely to the extension direction 71.

On the container 11 a plurality of exciters 3 are provided for generating an acoustic sound wave 5 (see FIG. 1(*b*)-(*e*)). These are arranged in the direction of extension 71 in rows (not labeled) and spaced from each other by a distance a. In a circumferential direction 74 to the axis 7, the rows are arranged in an evenly distributed manner. In this case, the exciter 3 adjacent rows are offset in the extension direction 3 with respect to each other.

In order to generate a stationary sound wave 5, preferably an ultrasonic wave, by wave interference, two mutually corresponding exciters 3 are respectively arranged opposite one another for generating a sound wave 5 of the same frequency, shape and amplitude. The mutually corresponding exciters 3 are designed as speakers and have a piezoelectric element (not shown) for generating the sound wave 5. Alternatively, it is preferred that one of the two exciters 3 be designed as a speaker, and the other as a reflector.

Figure 1:
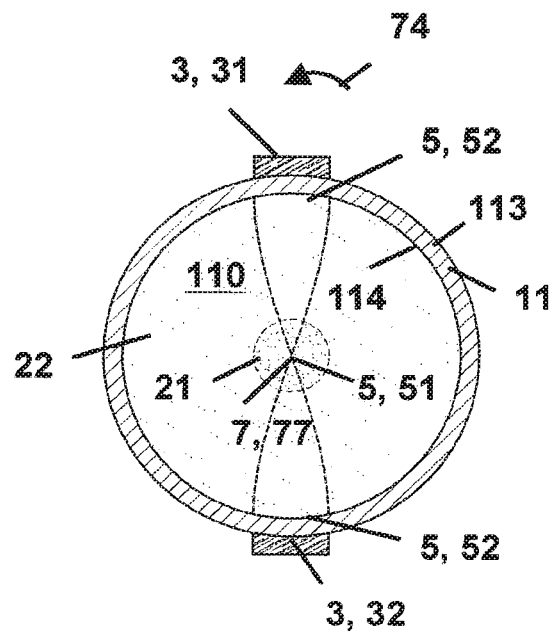
Figure 1:
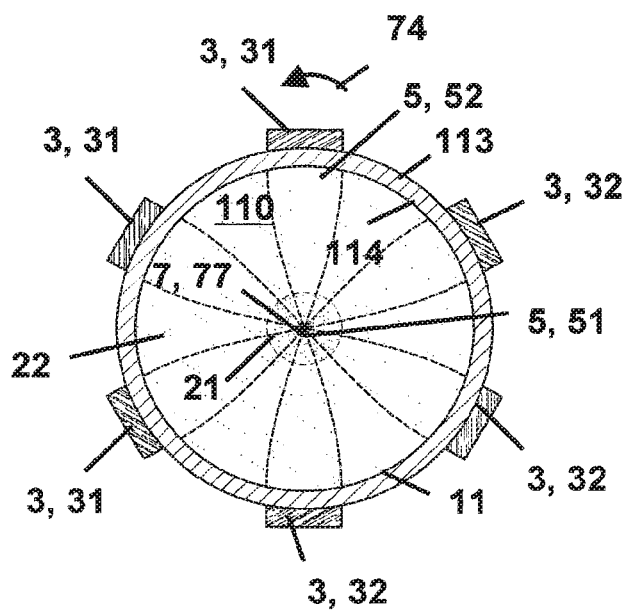

FIG. 1(*b*) shows a sectional view A-A of the aggregating device in (a). The cross section of the container 11 is visible. The exciters 3 are arranged on a surface 113 of the container 11. They each generate a sound wave 5 of the same frequency, shape and amplitude. Since each two exciters 3 are formed corresponding to one another and arranged opposite each other, the stationary sound wave 5 is generated by interference. The stationary sound waves 5 generated by two mutually corresponding exciters 3 are shown here by dashed lines. Their shape is chosen as sinusoidal only as an example.

The stationary sound waves 5 here have a pressure node 51 in the center of the container 11, and a respective pressure antinode 52 on an inner surface 114 of the container 11. The sound waves 5 therefore oscillate at their fundamental frequency. Also stationary waves 5, oscillating at their fundamental frequency, can be generated with the pressure antinode 52 disposed in the center 7 of the container 11, and the pressure node 51 arranged on the inner surface 114. In principle, sound waves 5 oscillating at a harmonic frequency can also be used.

In a liquid material 2, which flows through the inner space 110 of the container 11, and is thereby acted upon by the stationary waves 5, solid material particles and fibers 211 (see FIG. 1(*d*), (*e*)) contained in the liquid material 2, move in the pressure nodes 51 or in the pressure antinode 52. Shown here is by way of example a liquid material 2, whose solid material particles and fibers 211 thereby accumulate in a region (not labeled) around the pressure node 51. Through the concentration of the solid material particles and fibers 211, a liquid contained in the liquid material 2 (not labeled) is pressed towards the outside, i.e. the container inner surface 114. Therefore, a first material part 21 with aggregated solid material particles and fibers 211 is formed along the region extending concentrically around the axis 7. The remaining liquid material 2, also referred to below as the second material part 22, contains correspondingly less solid material particles and fibers 211. In principle, however, it is also possible here to use sound waves 5 with which the liquid of the liquid material 2 is pressed inwards, so that the solid material particles and fibers 211 move toward the container inner surface 114.

The region along which the first material part 21 accumulates extends approximately concentrically around a line 77 connecting the pressure nodes 51. Since the liquid material 2 is conveyed in the conveying direction 4, while it is acted upon by the sound wave 5, the first material part 21 is conveyed in the conveying direction 4. In addition, the sound waves 5 propagate at right angles 53 to the conveying direction 4. As a result, the line 77 extends in the conveying direction 4.

In contrast to the aggregating device 1 of FIGS. 1(*a*) and (*b*), in which exciters 3 are arranged distributed around the container 11 in the circumferential direction 74, the aggregating device 1 with the cross section of FIG. 1(*c*) has only two opposite rows with mutually corresponding exciters 3 for generating the sound waves 5.

FIG. 1(*d*) shows a sectional view of the aggregating device 1 in (a), which is shown rotated around the axis 7 by a right rotation angle. The accumulation of the solid material particles and fibers 211 in the region around the axis 7 is shown schematically. The liquid material 2 is conveyed in the conveying direction 4 through the container 11. The solid material particles and fibers 211 are thereby acted upon by the stationary waves 5. It can be seen that the stationary waves 5 propagate in a propagation direction 54 transversely to the conveying direction 4.

With the force of the sound waves 5, the solid material particles and fibers 211 are moved by applying the sound waves 5 to the pressure node 51 and accumulate there. In this case, the liquid contained in the liquid material 2 is pressed outwards. In the concentric region around the line 77, the first material part 21 with the concentrated, aggregated solid material particles and fibers 211 is formed. Since the container 11 has a circular cross section and the exciters 3 are arranged concentrically about the axis 7, the line 77 connecting the pressure nodes 51 extends along the axis 7.

In order to separate the first material part 21 from the liquid material 2, the container branch 12 extends into the container 11. It extends concentrically to the axis 7. The container branch 12 has a branch inlet 121, which is arranged at the center of the container 11. A diameter (not labeled) of the container branch 12 is selected to be sufficiently large so that the first material part 21 is received by the branch 12 through the branch inlet 121.

Exciters 3 are also provided on the container branch 12. These are here arranged in the limiting wall 115 of the container branch 12. As a result, the solid material particles and fibers 211 are further pressed into the pressure node 51 and liquid is forced outwards. The result is a sliding film 23, through which the first material part 21, despite its viscous consistency, can be conveyed through the container branch 12, without the latter being clogged.

In the embodiment of the aggregating device 1 of FIG. 1(*e*), sound waves 5 are generated with the exciters 3 arranged on the surface 113 of the container 11, whose pressure node 51 is arranged on the inner surface 114 of the container 11, and the pressure antinode 52 in the middle of the container 11. As a result, the liquid contained in the liquid material 2 is pressed into the middle 7 and the solid material particles and fibers 211 are pressed outwards toward the container inner surface 114.

Therefore, with the container branch 12, the second, liquid material part 22 is hereby skimmed off in the middle of the container 11. As a consequence, no further exciters 3 are provided in or on the container branch 12.

In order to be able to convey the liquid material 2 despite its paste-like consistency without clogging through the container 11, it is possible to introduce it in advance into a delivery fluid 24. Water can be, for example, a suitable conveying fluid 24, depending on the liquid material 2.

Figure 2:
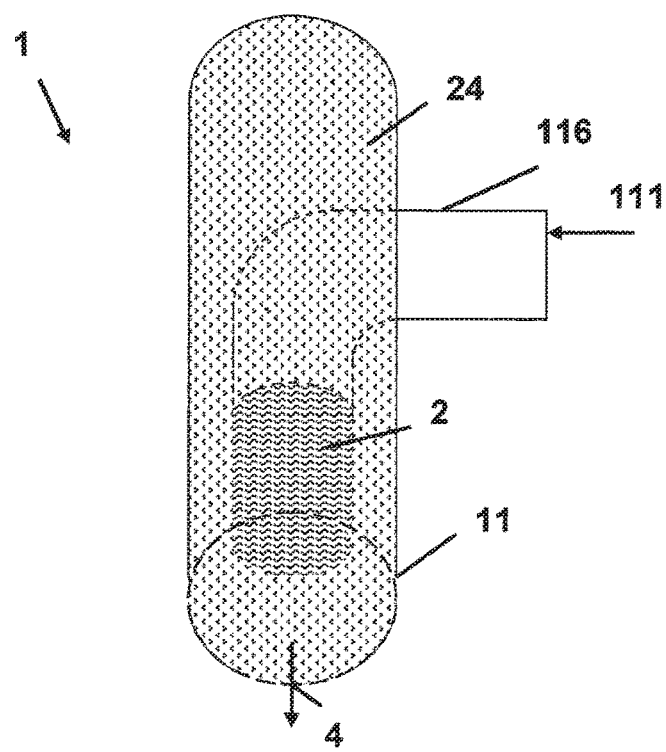
FIG. 2 shows in (a) and (b) respectively a detail of further embodiments of an aggregating device.
Figure 2:
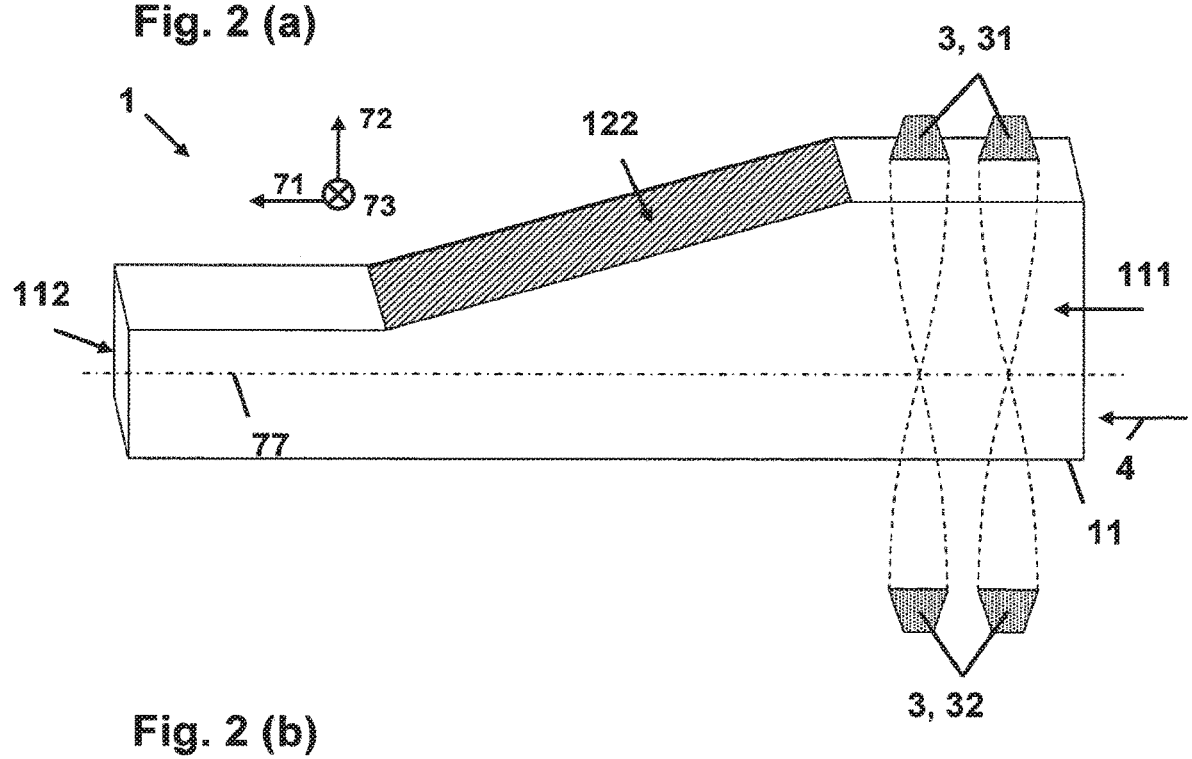

Introduction of the liquid material 2 into the conveying fluid 24 is shown schematically in FIG. 2(*a*). The container 11 is flowed through in the conveying direction 4 by the conveying fluid 24. The liquid material 2 is introduced centrally through a filler neck 116 in the container 11. As a result, the delivery fluid 24 surrounds the liquid material 2.

In the embodiment of FIG. 2(*b*), only the branch drain 122 is provided as a means for separating. The exciters 3 are positioned so that the stationary sound waves 5 generated with them have a pressure node 51, which waves are arranged in a spatial direction 72 transversely to the conveying direction 4 below the branch outlet 122. The line 77, around which the first material part 21 accumulates, is therefore located below the branch outlet 122.

Figure 3:
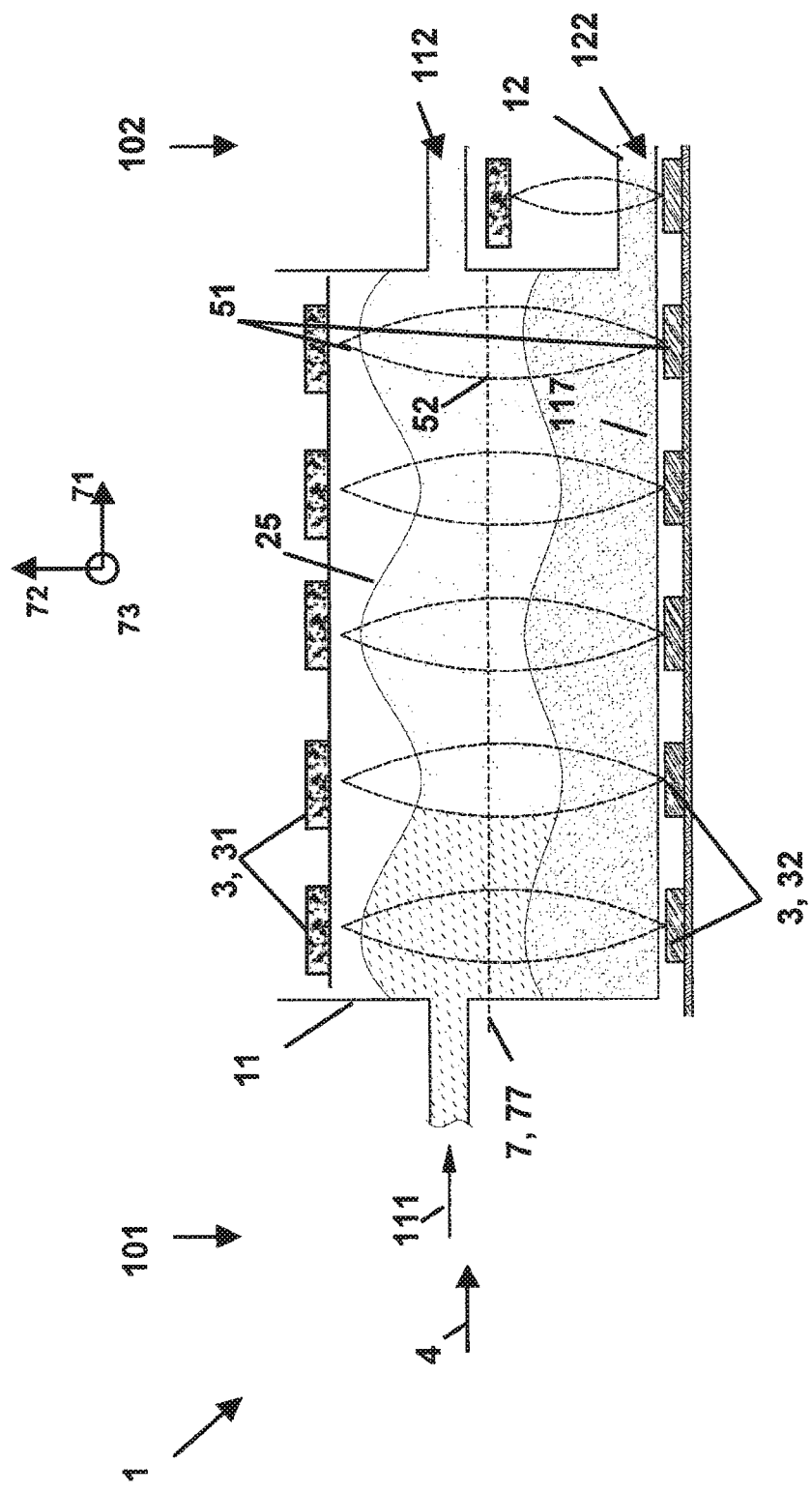
FIGS. 3 and 4 show respectively a further embodiment of an aggregating device.

FIG. 3 shows a further embodiment of an aggregating device 1. As a means for receiving and/or conveying the liquid material 2, a container 11, namely a tank, is provided here. The tank 11 has a container inlet 111 at the front end 101 of the aggregating device 1 and a container outlet 112 at the rear end 102 of the aggregating device 1. The container inlet 111 and the container outlet 112 are arranged approximately at the same height H of the tank 11.

Spaced exciters 3 are arranged in an extension direction 71 of the tank 11. The exciters 3 are arranged in rows in a second spatial direction 72 transversely to the direction of extension 71 below and above the tank 11. The exciters 3 above the tank 11 are placed so that a liquid level 25 of the liquid material 2 extends below the exciter 3. An exciter 3, 31 above the tank 11 and an exciter 3, 32 below the tank 11 are respectively formed corresponding to each other and produce a stationary sound wave 5. The sound waves 5 propagate in the tank 11 and have a pressure antinode 52 which extends along line 77. The line 77 is arranged in the second spatial direction 72 below the height H of the container inlet 111 and the container outlet 112.

The solid material particles and fibers 211 of the liquid material 22 conveyed into the tank 11 are moved to the pressure nodes 51 by means of the force of the sound waves 5. Since the pressure nodes 51 of the exciter 3 arranged in the second spatial direction 72 above the line 77 are positioned outside the liquid material 2, the solid material particles and fibers 211 accumulate here on the bottom 17 of the tank 11 and form the first material part 21.

As a means for separating 12, a branch outlet 122 is arranged close to the ground, through which the first material part 21 is conveyed in the conveying direction 4 from the tank 11. The second material part 22 flows through the container outlet 112 arranged along height H. In this embodiment of the aggregating device 1, the liquid pressure is used to convey the liquid material 2. In addition, a further conveying means 8, for example a liquid multiplier, can be provided.

Figure 4:
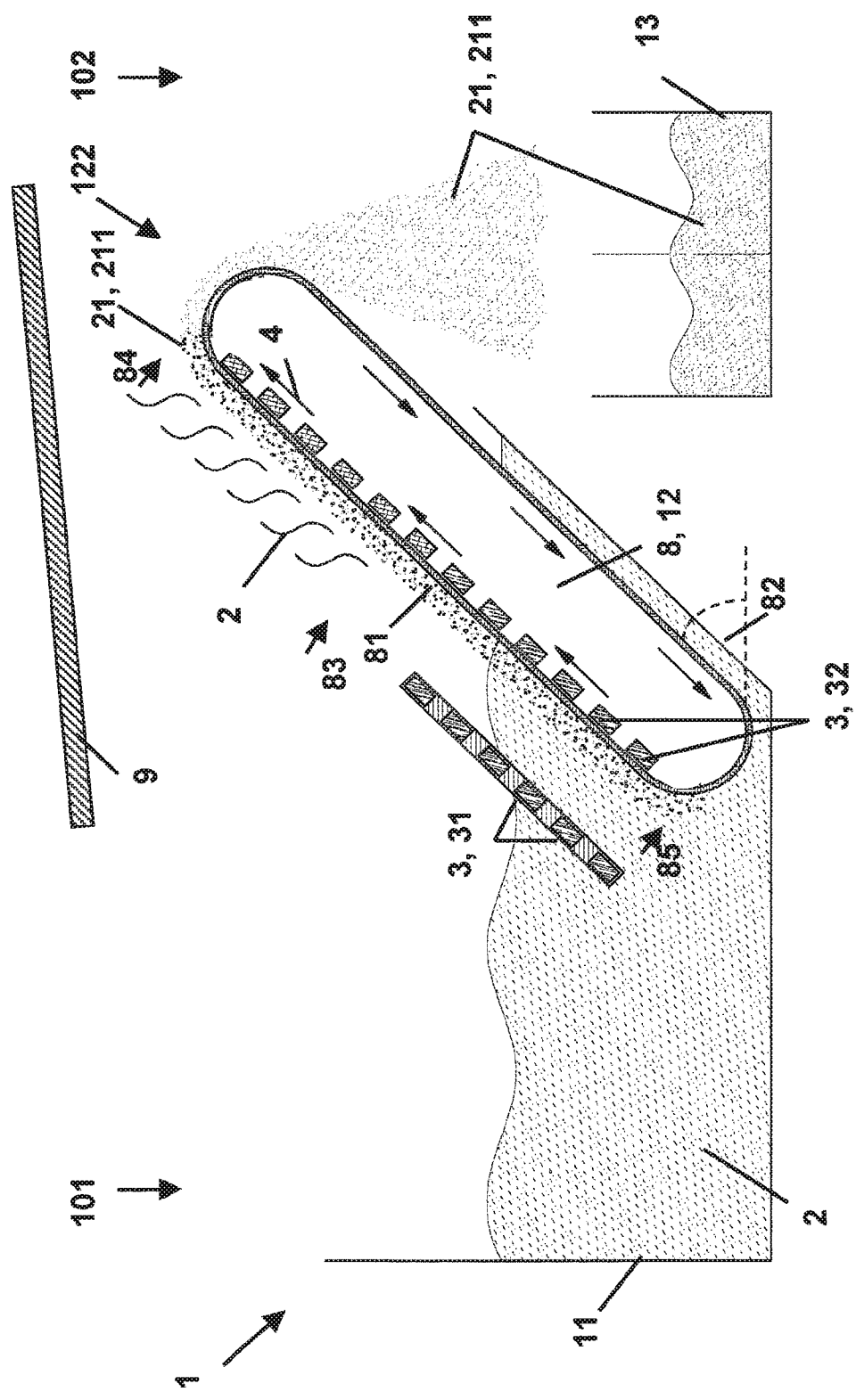
Figure 5:
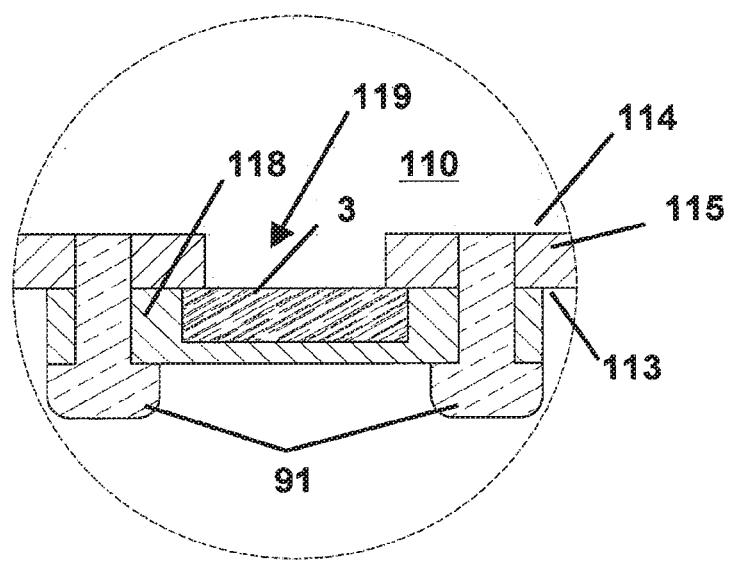
FIG. 5 shows in (a)-(d), respectively, attachment of a means for generating a sound wave to a container wall of an aggregating device.
Figure 5:
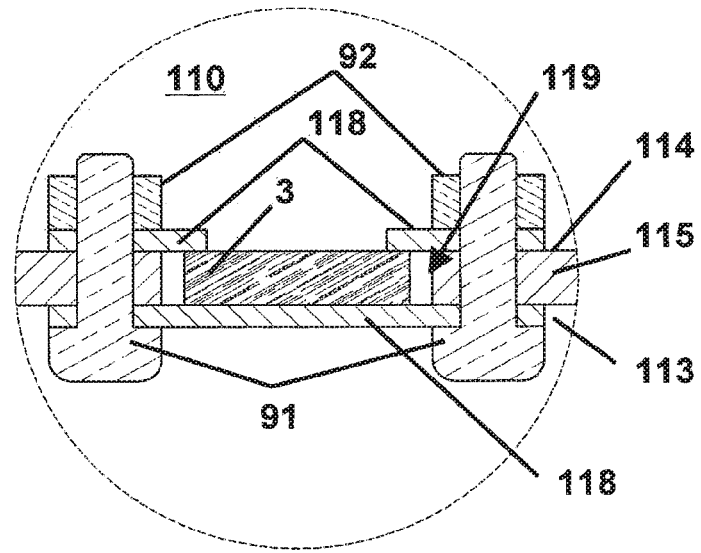
Figure 5:
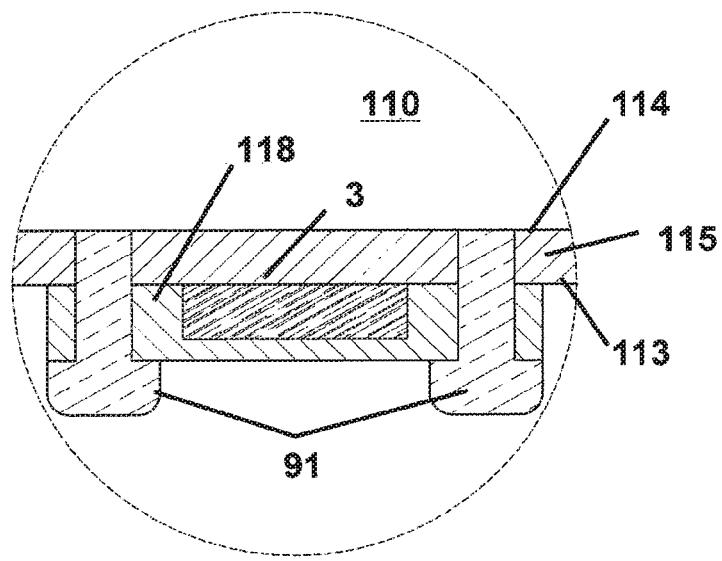
Figure 5:
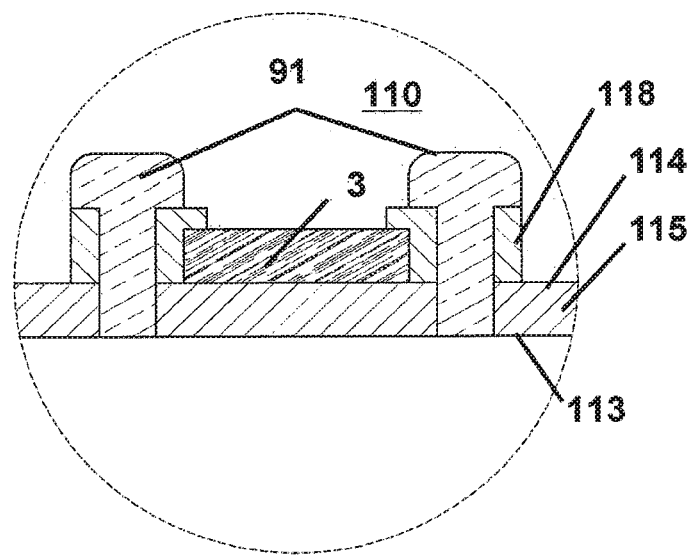

In the aggregating device of FIG. 4 a tank is also provided as a container 11 for receiving and/or conveying the liquid material 2. However, the liquid material 2 charged with the sound wave 5 is also conveyed here by means of a conveyor belt 8. The conveyor belt 8 dips with a lower return end 85 into the tank 11 and the liquid material 2. It has a conveyor belt surface 81 which has an inclination 82 relative to the horizontal plane (not labeled). On a conveying line 83 of the conveyor belt 8, the conveyor belt surface 81 is transported in a conveying direction 4.

The exciters 3 are arranged in rows below and above the conveyor belt surface 81. An exciter 3, 31 below and an exciter 3, 32 above the conveyor belt surface 81 each act in a corresponding manner to one another and produce a stationary sound wave 5.

The exciters 3 are placed so that a pressure node 51 forms on or below the conveyor belt surface 81. At this pressure node 51, the solid material particles and fibers 211 move. The first material part 21 therefore accumulates on the conveyor belt surface 81. When pressure nodes 51 are arranged below the conveyor belt surface 81, the solid material particles and fibers 211 are pressed onto the conveyor belt 8. It is dropped at an upper return end 84 of the conveyor belt 8 into a collecting container 13. The conveyor belt 8 is therefore also used here as a means 12 for separating the first material part 21 from the liquid material 2.

The liquid can flow off laterally or in the middle of the conveyor belt 8 and partially evaporated. For the evaporating liquid material 2, a return 9 is provided, on which it condenses. The return 9 is arranged obliquely with respect to the horizontal, so that the evaporated liquid is returned to the tank 11 back. But it can also be derived separately.

Such a conveyor belt 8 with the exciters 3 can also be used separately for solidifying and drying solid material particles and fibers 211. Depending on the liquid level of the liquid material, it may form the means for receiving and/or conveying the liquid material. In addition, containers for the liquid material, the first and/or the second material part may be provided. It is therefore suitable, for example, for drying and solidifying paper, drying and felting textiles, drying and solidifying sewage sludge and/or kitchen waste.

FIGS. 5(a)-(d) show, by way of example and schematically, the attachment of exciters 3 for generating a sound wave 5 on a container wall 15. In FIGS. 5(a) and (b), the container walls show a recess 119.

In FIG. 5(a), the exciter 3 on the surface 113 of the container wall 115 is aligned with the recess 119 by means of an attached holding plate 118. The latter is fixed with fastening means 91 such as rivets or screws in the container wall 15. The holding plate 118 has a receptacle (not labeled) for the exciter 3, which surrounds it. It is elastically designed to seal the recess 119 on the outside.

In FIG. 5(b), the exciter 3 is arranged in the recess 119. For this purpose, a plurality of holding plates 118 are provided, which are arranged on the inner surface 114 and on the surface 113 of the container wall 115. Also in this case, the holding plates 118 are elastically formed to seal the container 11. For fastening the retaining plates 118, screws with nuts 92 are provided here as fastening means 91.

The attachment of the exciter 3 in FIG. 5(c) corresponds to that in FIG. 5(a), but no recess is provided in the container wall. Instead, the exciter is arranged flat on the surface. This has the advantage that it does not come into contact with the liquid material 2.

In FIG. 5(d), the exciter 3 is arranged flat on the inner surface 113 of the container wall 115. Holding plates 118 are also provided, which hold the exciter 3 to the container wall 115. Here as well, rivets 91 are provided for attachment.

However, the exciters 3 can also be glued, riveted or stapled to the container wall 15, in particular to its surface 13. It is also possible to mount the exciters 3 in the container interior 110.

Figure 6:
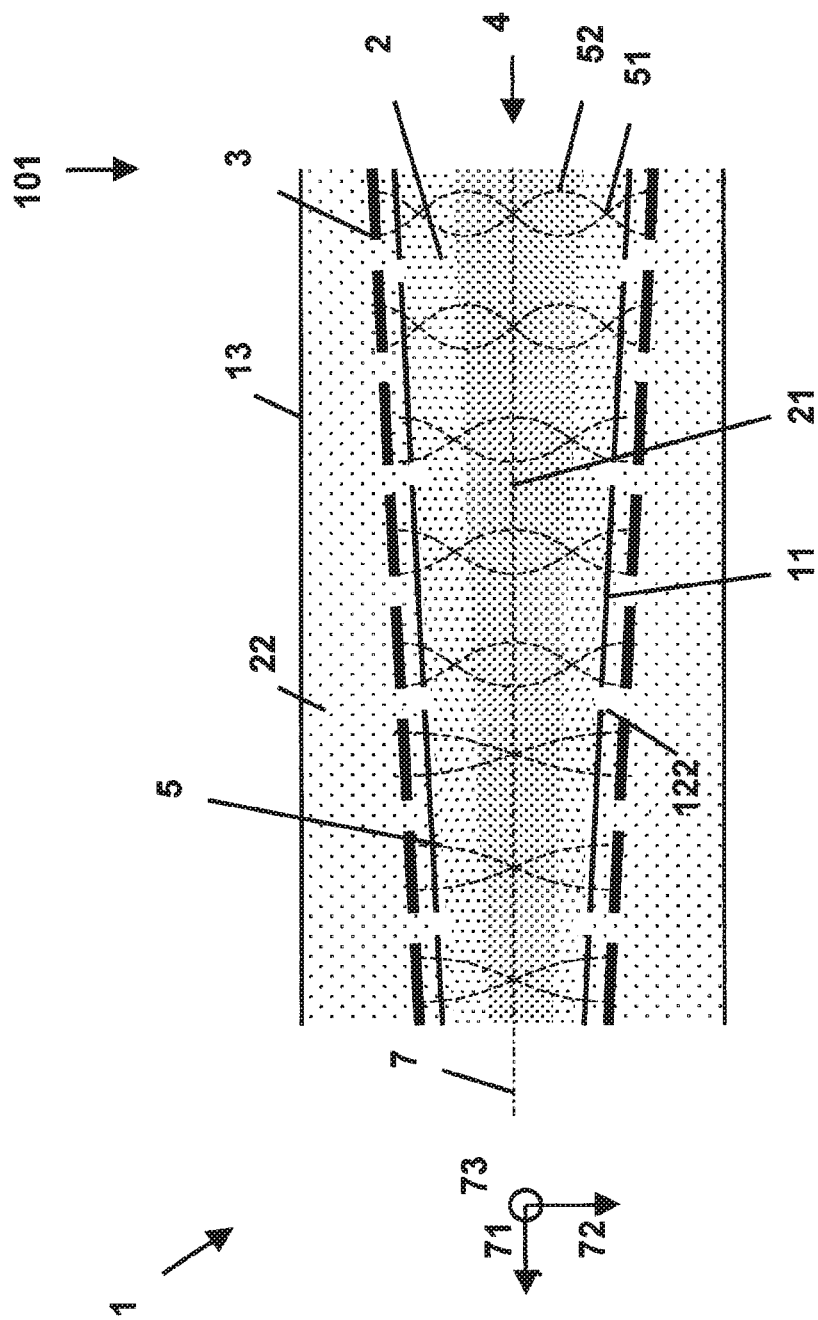
FIG. 6 shows a further embodiment of an aggregating device and a cross section through a paint shop.
Figure 7:
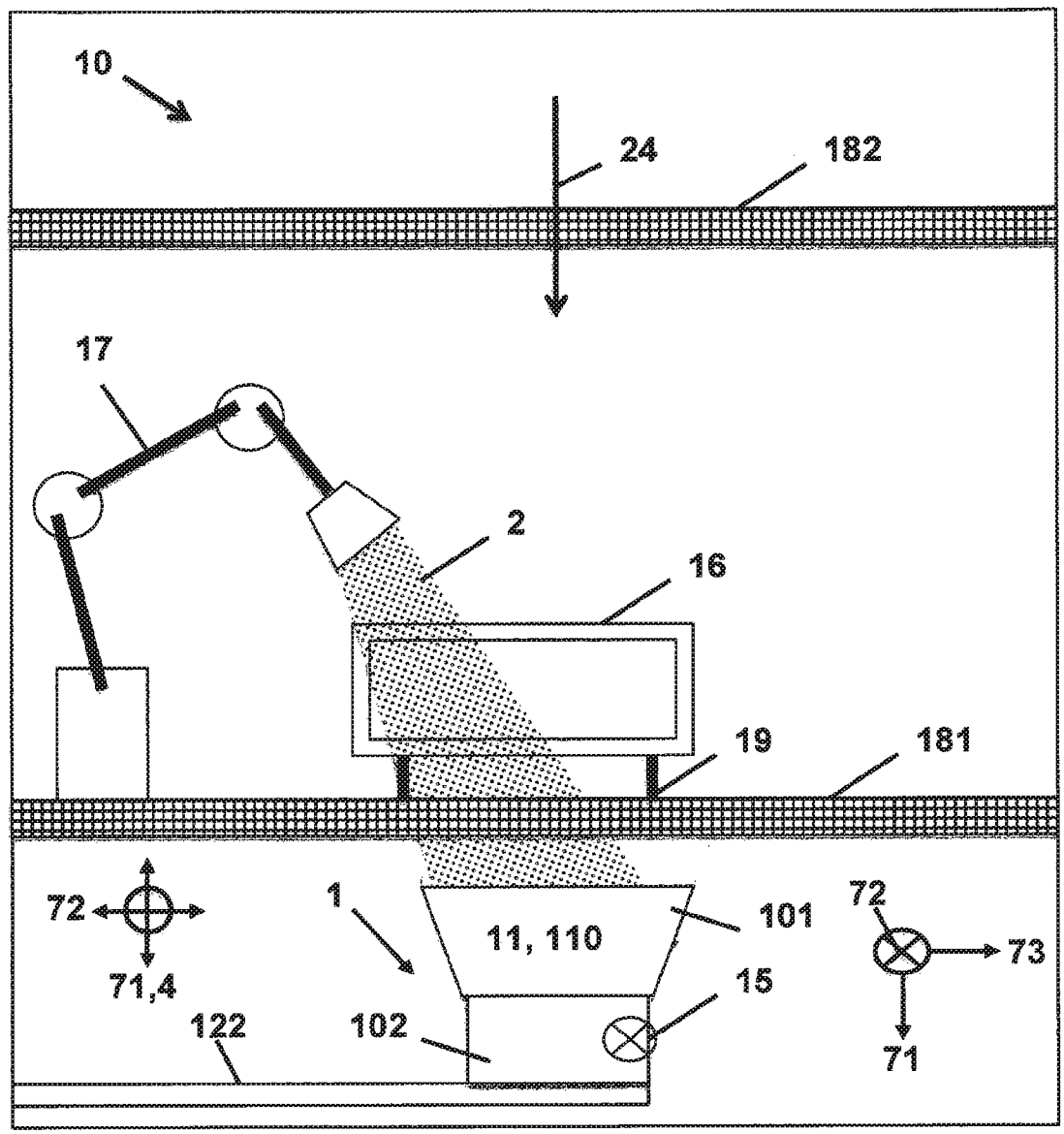
FIG. 7 shows a yet further embodiment of an aggregating device and a work piece to which an aerosol is applied.

FIG. 6 shows a further embodiment of an aggregating device 1 according to the invention. This aggregating device 1 has an inner tube as a container 11 for transporting the liquid material 2. In addition, it has an outer tube as a collecting container 13. The inner tube 11 has a plurality of outlet openings as a branch outlet 122, which are provided for discharging the liquid. In the following, the terms container 11 and inner tube, collecting container 13 and outer tube and outlet opening and branch outlet 122 will be used synonymously.

The liquid material 2 is introduced into the inner tube 11 at the front end 101.

The exciters 3 are arranged on the inner tube 11. They act on the liquid material 2 with the acoustic sound waves 5. As a result, the solid material particles and fibers 211 are moved by means of the force of the sound waves 5 to the pressure nodes 51 or the pressure antinodes 52. In this case, the liquid surrounding it is displaced into the second material part 22.

The acoustic sound waves 5 are provided here in such a way that the solid material particles and fibers 211 move into the inner tube center 7. For this purpose, different harmonics are used here as acoustic sound waves 5. The number of pressure nodes 51 and antinodes 52 of the harmonics decreases however in the conveying direction 4. As a result, the solid material particles and fibers 211 are focused with the harmonics in the inner tube center 7.

The first material part 21 containing aggregated solid material particles and fibers 211 is therefore further conveyed by the inner tube 11. The second material part 22, mainly containing the liquid, however, can be discharged through the outlet openings 122 in the outer tube 13.

The inner tube 11 tapers in the conveying direction 4. An outer diameter (not labeled) of the outer tube 13, however, is constant. As a result, the total cross section, in which the liquid material 2 is transported, is maintained. However, use of an inner tube 11 with constant diameter d1 is also preferred.

In order to improve the transport of the first material part 21 and/or of the second material part 22 and/or to create a phase separation line, a delivery fluid 24 can additionally be used in the inner tube 11 and/or in the outer tube 13.

Aggregating Devices 1 and Methods with Aerosols 2

FIG. 1a shows a first embodiment of an aggregating device 1. The aggregating device 1 comprises a container 11 (see FIG. 1(d), (e)) for receiving and for conveying an aerosol 2. The container 11 extends in an extension direction 71. The container 11 has here a circular cross section and extends concentrically to an axis 7. However, also containers 11 with a different cross section, for example with a rectangular or square cross section, can be used. The container 11 is formed as a hollow cylinder and has an inner space 110 (see FIG. 1(b), (c)).

In order to introduce the aerosol 2, the container 11 has an inlet 111, which is provided in a conveying direction 4 at a front end 102 of the container. The aerosol 2 is conveyed by means of an additional conveying means 8 in the conveying direction 4 through the container 11. As conveying means 8, a Dyson is shown schematically here.

Figure 1D:
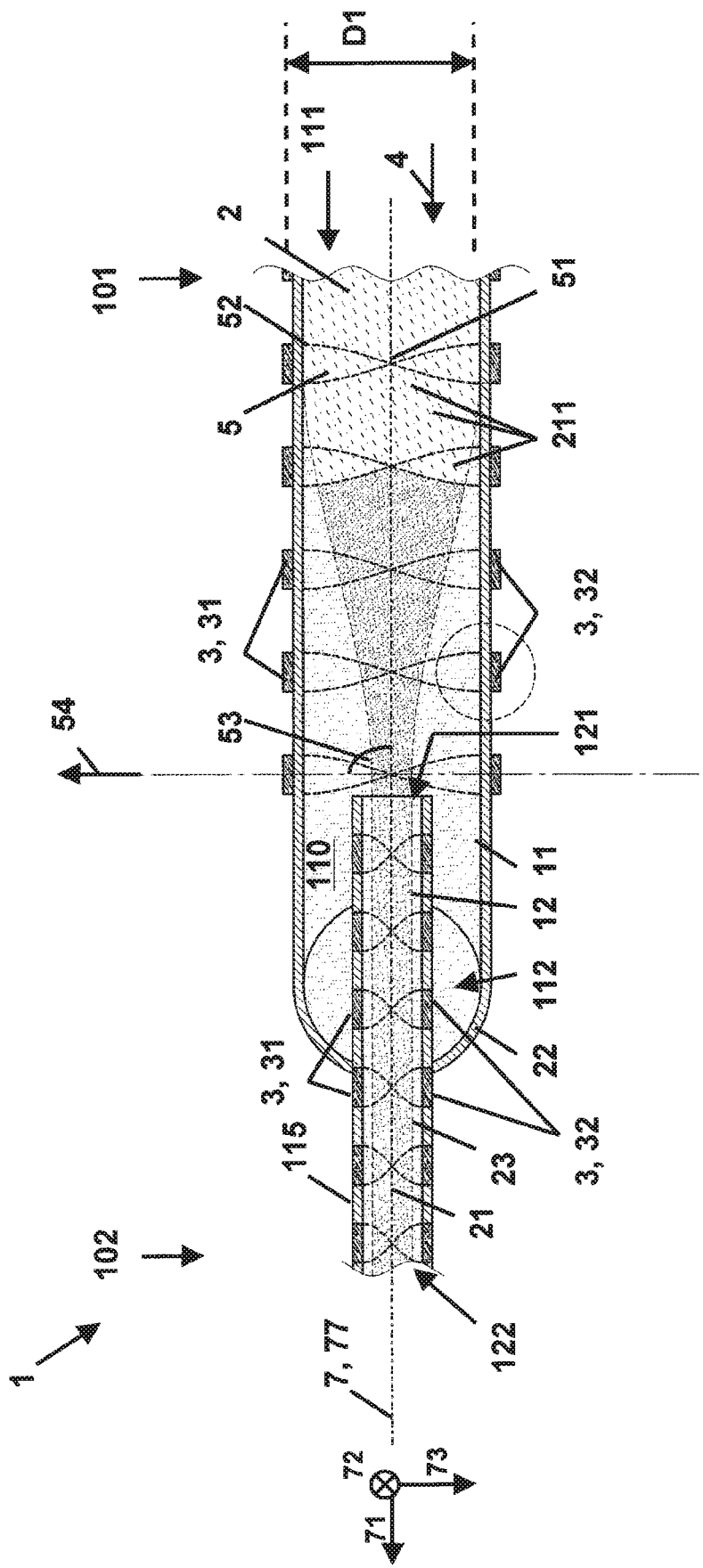

At a rear end 101 in the conveying direction 4, the aggregating device 1 has a means 12 for separating a first material part 21 (see FIG. 1(d), (e)) of the aerosol 2 on. The means for separating 12 is formed by a tubular container branch. The container branch 12 has a branch outlet 122 for the first material part 21.

For discharging the aerosol 2, the container 11 has a container outlet 112. The container outlet 1 12 is aligned here transversely to the extension direction 71 for clarity only.

On the container 11 a plurality of exciters 3 for generating an acoustic sound wave 5 (see FIG. 1(b)-(e)) are provided. These are arranged in the direction of extension 71 in rows (not labeled) and spaced from each other by a distance a. In a circumferential direction 74 to the axis 7, the rows are arranged in an evenly distributed manner. In this case, the exciter 3 adjacent rows are offset in the extension direction 3 with respect to each other.

In order to generate a stationary sound wave 5, preferably an ultrasonic wave, by wave interference, two mutually corresponding exciters 3 are respectively arranged opposite one another for generating a sound wave 5 of the same frequency, shape and amplitude. The mutually corresponding exciters 3 are designed as speakers and have a piezoelectric element (not shown) for generating the sound wave 5. Alternatively, it is preferred that one of the two exciters 3 be designed as a speaker, and the other as a reflector.

FIG. 1(b) shows a sectional view A-A of the aggregating apparatus of (a). The cross section of the container 11 is visible. The exciters 3 are arranged on a surface 113 of the container 11. They each generate the sound wave 5 of the same frequency, shape and amplitude. Since each two exciters 3 are formed corresponding to one another and arranged opposite each other, the stationary sound wave 5 is generated by interference. The stationary sound waves 5 generated by two mutually corresponding exciters 3 are shown here by dashed lines. Their shape is chosen as sinusoidal only as an example.

The stationary sound waves 5 here have a pressure node 51 in the center of the container 11, and a respective pressure antinode 52 on an inner surface 114 of the container 11. The sound waves 5 therefore oscillate at their fundamental frequency. Also stationary waves 5, oscillating at their fundamental frequency, can be generated with the pressure antinode 52 disposed in the center 7 of the container 11, and the pressure node 51 arranged on the inner surface 114. In principle, sound waves 5 oscillating at a harmonic frequency can also be used.

In an aerosol 2, which flows through the inner space 110 of the container 11, and is thereby acted upon by the stationary waves 5, solid material particles and fibers 211 (see FIG. 1(d), (e)) contained in the aerosol 2, move in the pressure nodes 51 or in the pressure antinode 52. Shown here is by way of example an aerosol 2, whose solid material particles and fibers 211 thereby accumulate in a region (not labeled) around the pressure node 51. Through the concentration of the solid material particles and fibers 211, a liquid contained in the aerosol 2 (not labeled) is pressed towards the outside, i.e. the container inner surface 114. Therefore, a first material part 21 with aggregated solid material particles and fibers 211 is formed along the region extending concentrically around the axis 7. The remaining aerosol 2, also referred to below as the second material part 22, contains correspondingly less solid material particles and fibers 211. In principle, however, it is also possible here to use sound waves 5 with which the liquid of the aerosol 2 is pressed inwards, so that the solid material particles and fibers 21 1 move toward the container inner surface 114.

The region along which the first material part 21 accumulates extends approximately concentrically around a line 77 connecting the pressure nodes 51. Since the aerosol 2 is conveyed in the conveying direction 4, while it is acted upon by the sound wave 5, the first material part 21 is conveyed in the conveying direction 4. In addition, the sound waves 5 propagate at right angles 53 to the conveying direction 4. As a result, the line 77 extends in the conveying direction 4.

In contrast to the aggregating device 1 of FIGS. 1(a) and (b), in which exciters 3 are arranged distributed around the container 11 in the circumferential direction 74, the aggregating device 1 with the cross section of FIG. 1(c) has only two opposite rows with mutually corresponding exciters 3 for generating the sound waves 5.

FIG. 1(d) shows a sectional view of the aggregating device 1 in (a), which is shown rotated about the axis 7 by a right rotation angle. The accumulation of the solid material particles and fibers 211 in the region around the axis 7 is shown schematically. The aerosol 2 is conveyed in the conveying direction 4 through the container 11. The solid material particles and fibers 211 are thereby acted upon by the stationary waves 5. It can be seen that the stationary waves 5 propagate in a propagation direction 54 transversely to the conveying direction 4.

With the force of the sound waves 5, the solid material particles and fibers 211 are moved by applying the sound waves 5 to the pressure node 51 and accumulate there. In this case, the liquid contained in the aerosol 2 is pressed outwards. In the concentric region around the line 77, the first material part 21 with the concentrated, aggregated solid material particles and fibers 211 is formed. Since the container 11 has a circular cross section and the exciters 3 are arranged concentrically about the axis 7, the line 77 connecting the pressure nodes 51 extends along the axis 7.

In order to separate the first material part 21 from the aerosol 2, the container branch 12 extends into the container 11. It extends concentrically to the axis 7. The container branch 12 has a branch inlet 121, which is arranged at the center of the container 11. A diameter (not labeled) of the container branch 12 is selected to be sufficiently large so that the first material part 21 is received by the branch 12 through the branch inlet 121.

Exciters 3 are also provided on the container branch 12. These are here arranged in the limiting wall 115 of the container branch 12. As a result, the solid material particles and fibers 211 are further pressed into the pressure node 51 and liquid is forced outwards. The result is a sliding film 23, through which the first material part 21, despite its viscous consistency, can be conveyed through the container branch 12, without the latter being clogged.

Figure 1E:
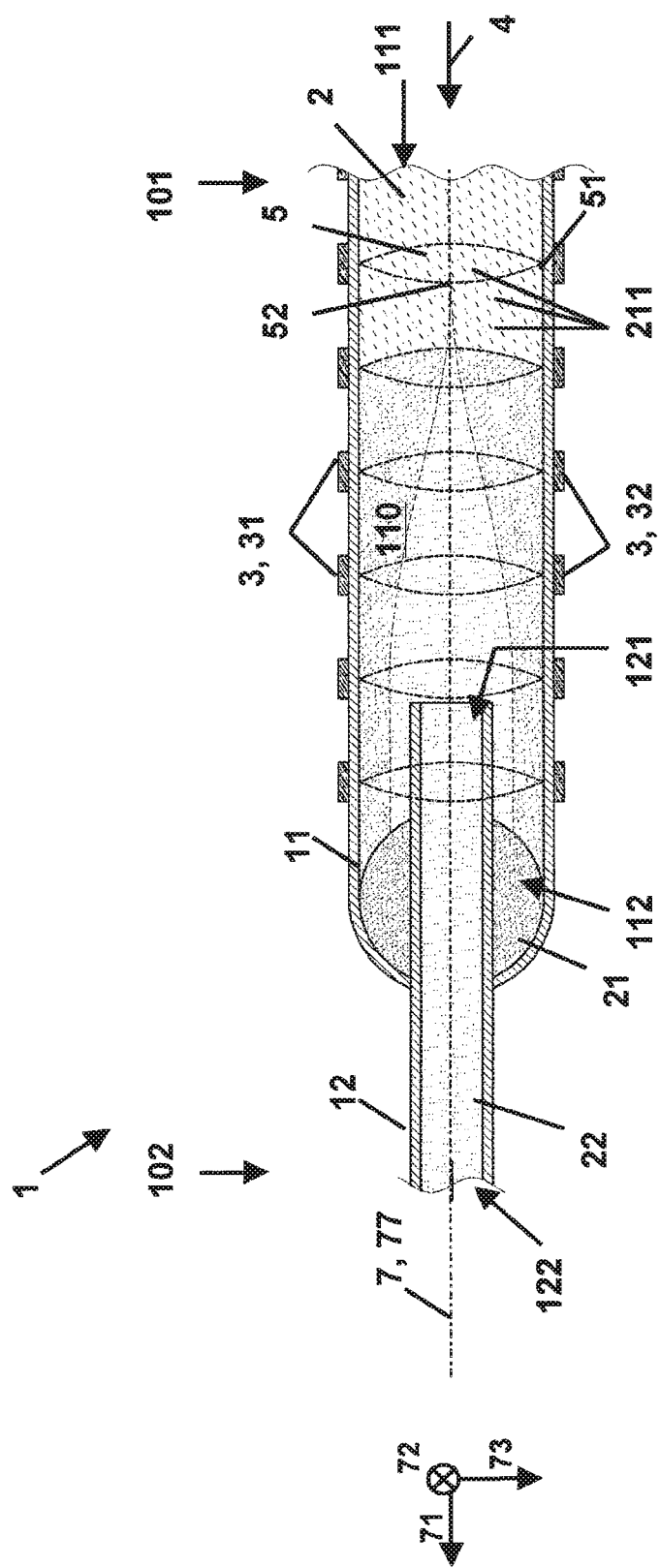

In the embodiment of the aggregating device 1 of FIG. 1(e), sound waves 5 are generated with the exciters 3 arranged on the surface 113 of the container 11, whose pressure node 51 is arranged on the inner surface 114 of the container 11, and the pressure antinode 52 in the middle of the container 11. As a result, the liquid contained in the aerosol 2 is pressed into the middle 7, and the solid material particles and fibers 211 are pressed outwards toward the container inner surface 114.

Therefore, with the container branch 12, the second, liquid material part 22 is hereby skimmed off in the middle of the container 11. As a consequence, no further exciters 3 are provided in or on the container branch 12.

In order to be able to convey the aerosol 2 despite its paste-like consistency without clogging through the container 11, it is possible to introduce it in advance into a delivery fluid 24. Water can be, for example, a suitable conveying fluid 24, depending on the aerosol 2.

Introduction of the aerosol 2 into the conveying fluid 24 is shown schematically in FIG. 2(a). The container 11 is flowed through in the conveying direction 4 by the conveying fluid 24. The aerosol 2 is introduced centrally through a filler neck 116 in the container 11. As a result, the delivery fluid 24 surrounds the aerosol 2.

In the embodiment of FIG. 2(b), only the branch drain 122 is provided as a means for separating. The exciters 3 are positioned so that the stationary sound waves 5 generated with them have a pressure node 51, which waves are arranged in a spatial direction 72 transversely to the conveying direction 4 below the branch outlet 122. The line 77, around which the first material part 21 accumulates, is therefore located below the branch outlet 122.

FIG. 3 shows a further embodiment of an aggregating device 1. As a means for receiving and/or conveying the aerosol 2, a container 11, namely a tank, is provided here. The tank 11 has a container inlet 111 at the front end 101 of the aggregating device 1 and a container outlet 112 at the rear end 102 of the aggregating device 1. The container inlet 111 and the container outlet 112 are arranged approximately at the same height H of the tank 11.

Spaced exciters 3 are arranged in an extension direction 71 of the tank 11. The exciters 3 are arranged in rows in a second spatial direction 72 transversely to the direction of extension 71 below and above the tank 11. The exciters 3 above the tank 11 are placed so that a liquid level 25 of the aerosol 2 extends below the exciter 3. An exciter 3, 31 above the tank 11 and an exciter 3, 32 below the tank 11 are respectively formed corresponding to each other and produce a stationary sound wave 5. The sound waves 5 propagate in the tank 11 and have a pressure antinode 52 which extends along line 77. The line 77 is arranged in the second spatial direction 72 below the height H of the container inlet 111 and the container outlet 112.

The solid material particles and fibers 211 of the aerosol 22 conveyed into the tank 11 are moved to the pressure nodes 51 by means of the force of the sound waves 5. Since the pressure nodes 51 of the exciter 3 arranged in the second spatial direction 72 above the line 77 are positioned outside the aerosol 2, the solid material particles and fibers 211 accumulate here on the bottom 17 of the tank 11 and form the first material part 21.

As a means for separating 12, a branch outlet 122 is arranged close to the ground, through which the first material part 21 is conveyed in the conveying direction 4 from the tank 11. The second material part 22 flows through the container outlet 112 arranged along height H. In this embodiment of the aggregating device 1, the liquid pressure is used to convey the aerosol 2. In addition, a further conveying means 8, for example a liquid multiplexer, can be provided.

In the aggregating device of FIG. 4 a tank is also provided as a container 11 for receiving and/or conveying the aerosol 2. However, the aerosol 2 charged with the sound wave 5 is also conveyed here by means of a conveyor belt 8. The conveyor belt 8 dips with a lower return end 85 into the tank 11 and the aerosol 2. It has a conveyor belt surface 81 which has an inclination 82 relative to the horizontal plane (not labeled). On a conveying line 83 of the conveyor belt 8, the conveyor belt surface 81 is transported in a conveying direction 4.

The exciters 3 are arranged in rows below and above the conveyor belt surface 81. An exciter 3, 31 below and an exciter 3, 32 above the conveyor belt surface 81 each act in a corresponding manner to one another and produce a stationary sound wave 5.

The exciters 3 are placed so that a pressure node 51 forms on or below the conveyor belt surface 81. At this pressure node 51, the solid material particles and fibers 211 move. The first material part 21 therefore accumulates on the conveyor belt surface 81. When pressure nodes 51 are arranged below the conveyor belt surface 81, the solid material particles and fibers 211 are pressed onto the conveyor belt 8. It is dropped at an upper return end 84 of the conveyor belt 8 into a collecting container 13. The conveyor belt 8 is therefore also used here as a means 12 for separating the first material part 21 from the aerosol 2.

The liquid can flow off laterally or in the middle of the conveyor belt 8 and partially evaporated. For the evaporating aerosol 2, a return 9 is provided, on which it condenses. The return 9 is arranged obliquely with respect to the horizontal, so that the evaporated liquid is returned to the tank 11 back. But it can also be derived separately.

Such a conveyor belt 8 with the exciters 3 can also be used separately for solidifying and drying solid material particles and fibers 211. Depending on the liquid level of the aerosol, it may form the means for receiving and/or conveying the aerosol. In addition, containers for the aerosol, the first and/or the second material part may be provided. It is therefore suitable, for example, for drying and solidifying paper, drying and felting textiles, drying and solidifying sewage sludge and/or kitchen waste.

FIGS. 5(a)-(d) show, by way of example and schematically, the attachment of exciters 3 for generating a sound wave 5 on a container wall 15. In FIGS. 5(a) and (b), the container walls show a recess 119.

In FIG. 5(a), the exciter 3 on the surface 113 of the container wall 115 is aligned with the recess 119 by means of an attached holding plate 118. The latter is fixed with fastening means 91 such as rivets or screws in the container wall 15. The holding plate 118 has a receptacle (not labeled)

for the exciter 3, which surrounds it. It is elastically designed to seal the recess 119 on the outside.

In FIG. 5(b), the exciter 3 is arranged in the recess 119. For this purpose, a plurality of holding plates 118 are provided, which are arranged on the inner surface 114 and on the surface 113 of the container wall 115. Also in this case, the holding plates 118 are elastically formed to seal the container 11. For fastening the retaining plates 118, screws with nuts 92 are provided here as fastening means 91.

The attachment of the exciter 3 in FIG. 5(c) corresponds to that in FIG. 5(a), but no recess is provided in the container wall. Instead, the exciter is arranged flat on the surface. This has the advantage that it does not come into contact with the aerosol 2.

In FIG. 5(d), the exciter 3 is arranged flat on the inner surface 113 of the container wall 115. Holding plates 118 are also provided, which hold the exciter 3 to the container wall 115. Here as well, rivets 91 are provided for attachment.

However, the exciters 3 can also be glued, riveted or stapled to the container wall 15, in particular to its surface 13. It is also possible to mount the exciters 3 in the container interior 110.

FIG. 6 shows a further embodiment of an aggregating device 1 according to the invention. This aggregating device 1 has an inner tube as a container 11 for transporting the aerosol 2. In addition, it has an outer tube as a collecting container 13. The inner tube 11 has a plurality of outlet openings as a branch outlet 122, which are provided for discharging the liquid. In the following, the terms container 11 and inner tube, collecting container 13 and outer tube and outlet opening and branch outlet 122 will be used synonymously.

The aerosol 2 is introduced into the inner tube 11 at the front end 101.

The exciters 3 are arranged on the inner tube 11. They act on the aerosol 2 with the acoustic sound waves 5. As a result, the solid material particles and fibers 211 are moved by means of the force of the sound waves 5 to the pressure nodes 51 or the pressure antinodes 52. In this case, the liquid surrounding it is displaced into the second material part 22.

The acoustic sound waves 5 are provided here in such a way that the solid material particles and fibers 211 move into the inner tube center 7. For this purpose, different harmonics are used here as acoustic sound waves 5. The number of pressure nodes 51 and antinodes 52 of the harmonics decreases however in the conveying direction 4. As a result, the solid material particles and fibers 211 are focused with the harmonics in the inner tube center 7.

The first material part 21 containing aggregated solid material particles and fibers 211 is therefore further conveyed by the inner tube 11. The second material part 22, mainly containing the liquid, however, can be discharged through the outlet openings 122 in the outer tube 13.

The inner tube 11 tapers in the conveying direction 4. An outer diameter (not labeled) of the outer tube 13, however, is constant. As a result, the total cross section, in which the aerosol 2 is transported, is maintained. However, use of an inner tube 11 with constant diameter d1 is also preferred.

In order to improve the transport of the first material part 21 and/or of the second material part 22 and/or to create a phase separation line, a delivery fluid 24 can also be used in the inner tube 1 and/or in the outer tube 13.

FIG. 7 shows a yet further embodiment of an aggregating device and a work piece to which an aerosol is applied. FIG. 7 shows, for example, painting lines 10. At 24, FIG. 7 shows conveying fluid, such as a sheet layer of paint, through ceiling diffusers 182. A robotic spray arm 17 for use with a paint application is also shown in FIG. 7. Robotic spray arm 17 may apply liquid materials or an aerosol 2 to a work piece 16. The work piece may ride on a conveyor belt on an assembly line shown at 19. Conveyor belt on an assembly line 19 may be disposed above a set of floor grilles 181.

Receipt of liquid material or aerosol may be deposited in a tube or tank 10—where the tube or tank has an interior 110. The liquid material or aerosol in tube or tank 10 may be subjected to a spot or reflected application of ultra-violet light, infra-red light or microwaves as shown at 15. Following being subjected to a spot or reflected application of ultra-violet light, infra-red light or microwaves as shown at 15, the liquid material or aerosol in tube or tank 10 may exit through a rear end 102 and via a branch outlet 122. For reference first, second and third spatial directions are indicated at 71, 72 and 73, while circumferential direction is indicated at 71, 4.

The invention claimed is:

1. An aggregating device for separation and/or purification of aerosols and solid material particles from gases, comprising:

(a) an aggregating tube having an inlet at a front end, an outlet at a rear end, and a round cross section, the tube extending concentrically around an axis, said aggregating tube forming aggregated solid material particles;

(b) a conveying means conveying an aerosol in a conveying direction into the front end of the tube, wherein the aerosol comprises the solid material particles and gases;

(c) a plurality of mutually corresponding exciters arranged opposite to each other and located within the aggregating tube, each exciter comprising a piezoelectric element, each pair of mutually corresponding exciters generating a standing acoustic sound wave at a right angle to the conveying direction, wherein:

(i) the solid material particles move towards a plurality of pressure nodes by a force of the standing acoustic sound waves and form aggregated solid material particles in a space around the plurality of pressure nodes; and (ii) the gases move toward a plurality of pressure antinodes by the force of the standing acoustic waves;

(d) a filter separating the aggregated solid material particles from the gases; and (e) an ultra-violet (UV) radiator fixedly mounted relative to the container heating the aggregated solid material particles in the aggregating tube;

wherein:

each pair of mutually corresponding exciters generates a standing acoustic sound wave having a multiple pressure nodes and multiple pressure antinodes between the pair of mutually corresponding exciters; and a particle passing between the pair of mutually corresponding exciters moves toward one of the multiple pressure nodes.

2. The aggregating device according to claim 1, wherein a plurality of acoustic sound waves emitted by the plurality of corresponding exciters is dynamically digitally controllable, using a digital controller, via a difference in phase of the standing acoustic sound waves, such that the plurality of pressure nodes and the plurality of pressure antinodes is moveable in a controlled manner to a plurality of preselected locations.

3. The aggregating device according to claim 2, further comprising a container discharge.

4. The aggregating device according to claim 2, wherein control of the plurality of pressure nodes and the plurality of pressure antinodes is performed through a combination of Boolean logic gates.

5. The aggregating device according to claim 1, further comprising a container discharge.

6. The aggregating device according to claim 1, wherein the standing acoustic sound waves are dynamically controlled digitally via a difference in phase of the standing acoustic sound waves, such that the plurality of pressure nodes and the plurality of pressure antinodes are moveable in a controlled manner to a plurality of preselected locations.

7. The aggregating device according to claim 6, wherein control of the plurality of pressure nodes and the plurality of pressure antinodes is performed by using a combination of Boolean logic gates.

8. The aggregating device according to claim 1, wherein the standing acoustic sound waves have a frequency and/or volume outside a hearing range of humans and animals.

9. The aggregating device according to claim 1, wherein the standing acoustic waves are stationary ultrasonic waves.

10. The aggregating device according to claim 1, further comprising a radiator.

11. The aggregating device according to claim 10, further comprising a reflector arranged behind and opposite to the radiator.

12. The aggregating device according to claim 10, wherein the tube comprises window for the radiator.

13. The aggregating device according to claim 1, wherein the aggregating tube has a surface, the surface being selected from the group consisting of a renewable surface, a structured surface, a smooth surface, a rough surface, a biocidal surface, an absorbent surface and combinations thereof.

14. The aggregating device according to claim 1, wherein the plurality of exciters is arranged in a plurality of rows and separated from each other by a predetermined distance, each exciter forming a pair with a mutually corresponding exciter in a different row.

15. A closed gas cycle, comprising:
(a) the aggregating device according to claim 1;
(b) a heat recovery device; and
(c) a downstream and/or an upstream air filter.

16. The closed gas cycle according to claim 15, wherein the downstream and/or upstream air filter is a HEPA filter.

17. A method of using an aggregating device, comprising:
(a) providing the aggregating device according to claim 1; and
(b) using the aggregating device for the disposal of biogas plant waste, surface coating agents, paint residues, effluent and/or aerosols containing paints, varnishes, sealants and/or fiber material, for the destruction of microorganisms, in particular bacteria, for purifying air at home, in air conditioning, in medical ventilation, in closed vehicles, especially automobiles, trucks, buses, trains, ships and aircraft, as well as in cell cultures.

18. A method for the separation and/or purification of aerosols and solid material particles from gases, comprising:
(a) providing an aerosol having solid material particles and gases;
(b) providing a tube container having an inlet at a front end, an outlet at a rear end, and a round cross section, the tube extending concentrically around an axis;
(c) receiving the aerosol in a conveying direction into the inlet of the tube;
(d) acting upon the aerosol by a plurality of standing acoustic sound wave, such that the solid material particles move away from the gases, wherein the solid material particles move toward a plurality of pressure nodes by a force of the standing acoustic sound waves, and wherein the gases move toward a plurality of pressure antinodes by the force of the standing acoustic sound waves;
(e) condensing the solid material particles by the force of the plurality of the standing acoustic sound waves,
(f) using an ultra-violet (UV) heating device to heat the solid material particles so as to kill bacteria, biofilms and viruses; and
(g) separating the solid material particles from the gases of the aerosol.

19. A painting device comprising the aggregating device according to claim 1.

* * * * *